United States Patent
Ishikawa et al.

(10) Patent No.: US 9,174,698 B2
(45) Date of Patent: Nov. 3, 2015

(54) VEHICLE HEIGHT ADJUSTING DEVICE AND VEHICLE HEIGHT ADJUSTING METHOD

(71) Applicant: Showa Corporation, Gyoda-shi (JP)

(72) Inventors: Fumiaki Ishikawa, Haga-gun (JP); Yosuke Murakami, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/495,130

(22) Filed: Sep. 24, 2014

(65) Prior Publication Data
US 2015/0259028 A1    Sep. 17, 2015

(30) Foreign Application Priority Data
Mar. 13, 2014 (JP) .................................. 2014-050673

(51) Int. Cl.
| | |
|---|---|
| *B60G 17/00* | (2006.01) |
| *B60P 1/00* | (2006.01) |
| *B62K 25/28* | (2006.01) |
| *B62K 25/08* | (2006.01) |
| *B62K 25/04* | (2006.01) |

(52) U.S. Cl.
CPC .............. *B62K 25/283* (2013.01); *B62K 25/08* (2013.01); *B62K 2025/044* (2013.01); *B62K 2025/045* (2013.01)

(58) Field of Classification Search
USPC .......... 280/5.514, 6.151, 6.152, 6.153, 6.154, 280/6.155
See application file for complete search history.

(56) References Cited

U.S. PATENT DOCUMENTS

| | | | |
|---|---|---|---|
| 4,568,101 A | 2/1986 | Bleustein et al. | |
| 5,058,017 A * | 10/1991 | Adachi et al. | 701/38 |
| 5,211,420 A | 5/1993 | Iwashita | |
| 5,515,274 A * | 5/1996 | Mine et al. | 701/38 |
| 5,684,698 A * | 11/1997 | Fujii et al. | 701/38 |
| 5,711,390 A * | 1/1998 | Hikichi et al. | 180/219 |
| 7,841,608 B2 * | 11/2010 | Morris et al. | 280/124.16 |
| 8,285,448 B2 * | 10/2012 | Inoue et al. | 701/37 |
| 8,672,334 B1 * | 3/2014 | Murakami et al. | 280/5.514 |
| 8,672,337 B2 * | 3/2014 | van der Knaap et al. | 280/124.106 |
| 8,684,366 B2 * | 4/2014 | Murakami et al. | 280/5.514 |
| 8,783,695 B2 * | 7/2014 | Murakami et al. | 280/5.514 |
| 8,844,944 B1 * | 9/2014 | Murakami | 280/5.514 |
| 2007/0029711 A1 * | 2/2007 | Ehara et al. | 267/64.28 |
| 2014/0077464 A1 * | 3/2014 | Murakami et al. | 280/5.514 |

FOREIGN PATENT DOCUMENTS

| | | |
|---|---|---|
| DE | 3930966 A | 3/1990 |
| JP | 58-012816 A | 1/1983 |
| JP | 08-022680 B | 3/1996 |
| JP | 2014-008889 A | 1/2014 |
| WO | WO-2008/038321 A | 4/2008 |

OTHER PUBLICATIONS

U.S. Appl. No. 14/226,065, filed Mar. 26, 2014, Kasuga et al.
European Search Report mailed Feb. 18, 2015 for the corresponding European Application No. 14186510.5.

* cited by examiner

*Primary Examiner* — Toan To
(74) *Attorney, Agent, or Firm* — Leason Ellis LLP

(57) ABSTRACT

A vehicle height adjusting device includes a front fork and a rear suspension capable of changing the relative position between a vehicle body and wheels of a vehicle, and a control device that adjusts a vehicle height, which is a height of the vehicle body, by controlling the front fork and the rear suspension to change the relative position. The control device changes a vehicle height change rate, which is a rate of changing the vehicle height to a target vehicle height during stoppage, on the basis of deceleration of the vehicle.

6 Claims, 18 Drawing Sheets

FIG. 3A
COMPRESSION PROCESS
FIG. 3B
EXTENSION PROCESS
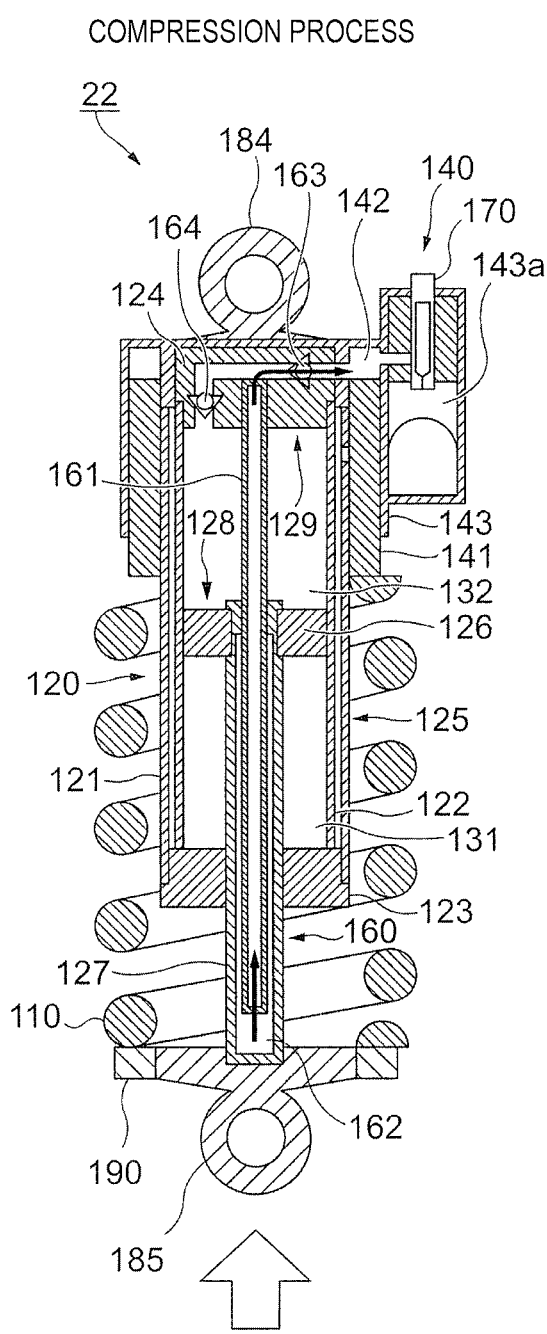
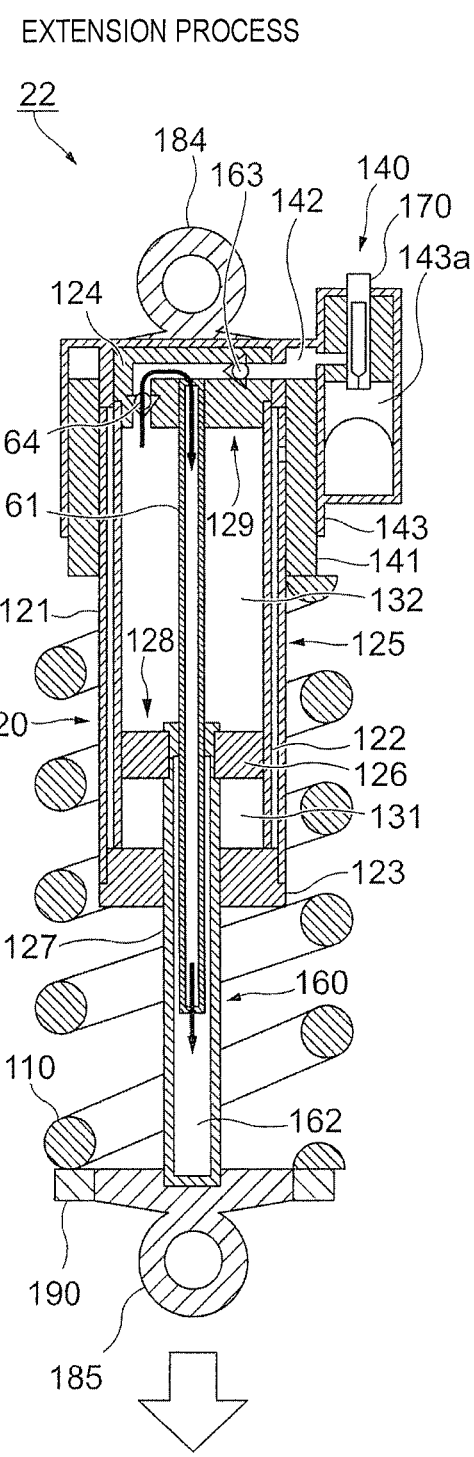

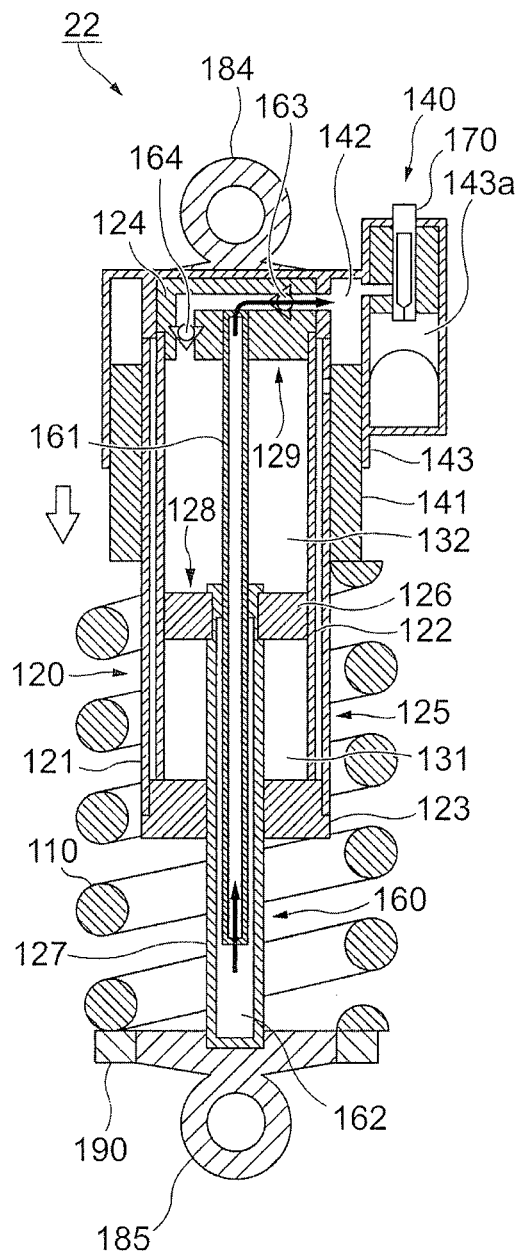
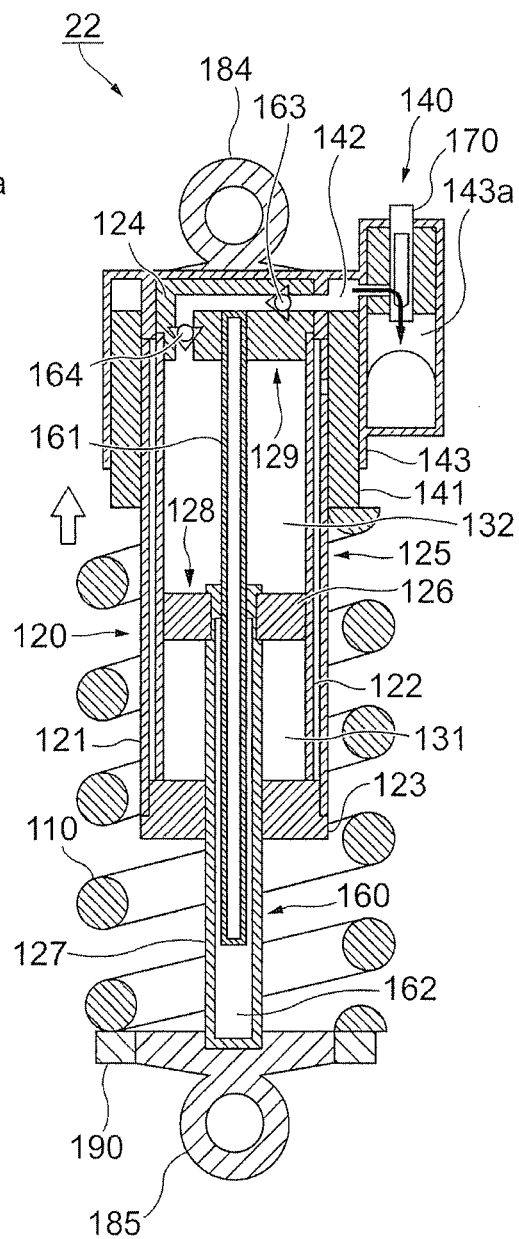
FIG. 4A
FIG. 4B

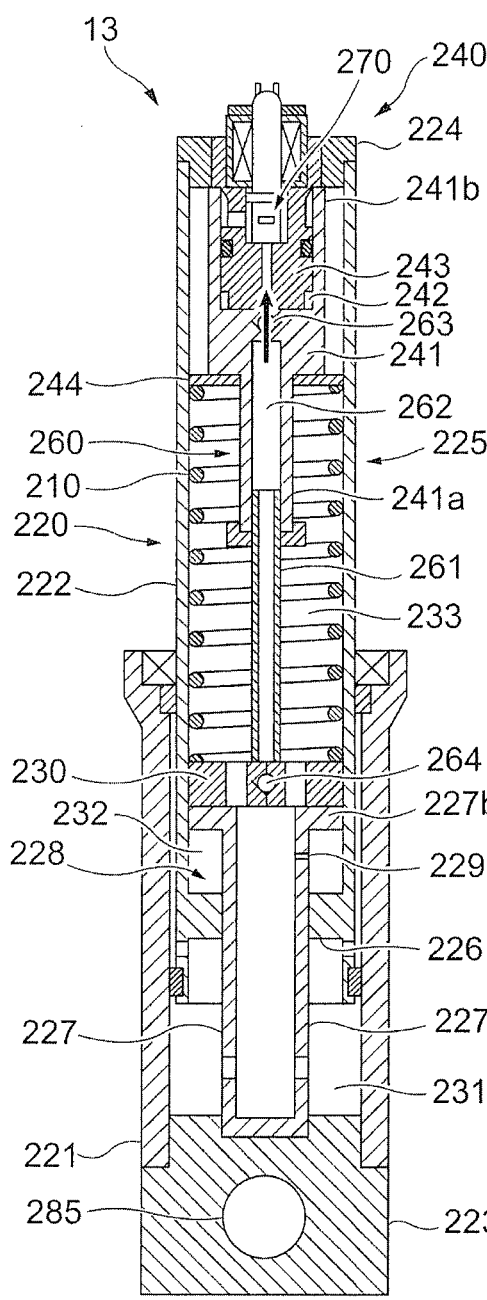
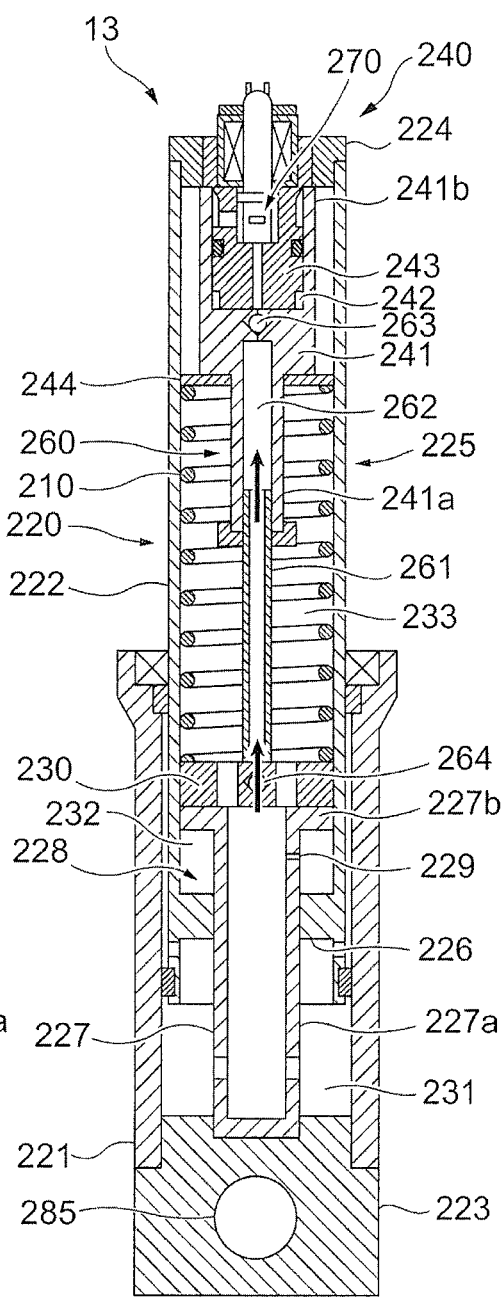

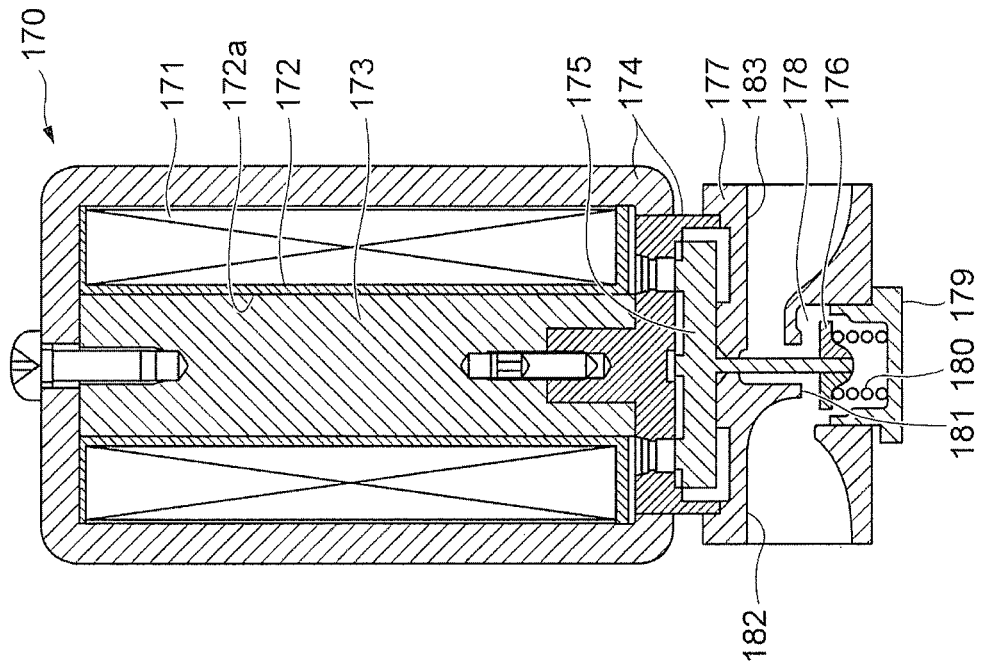
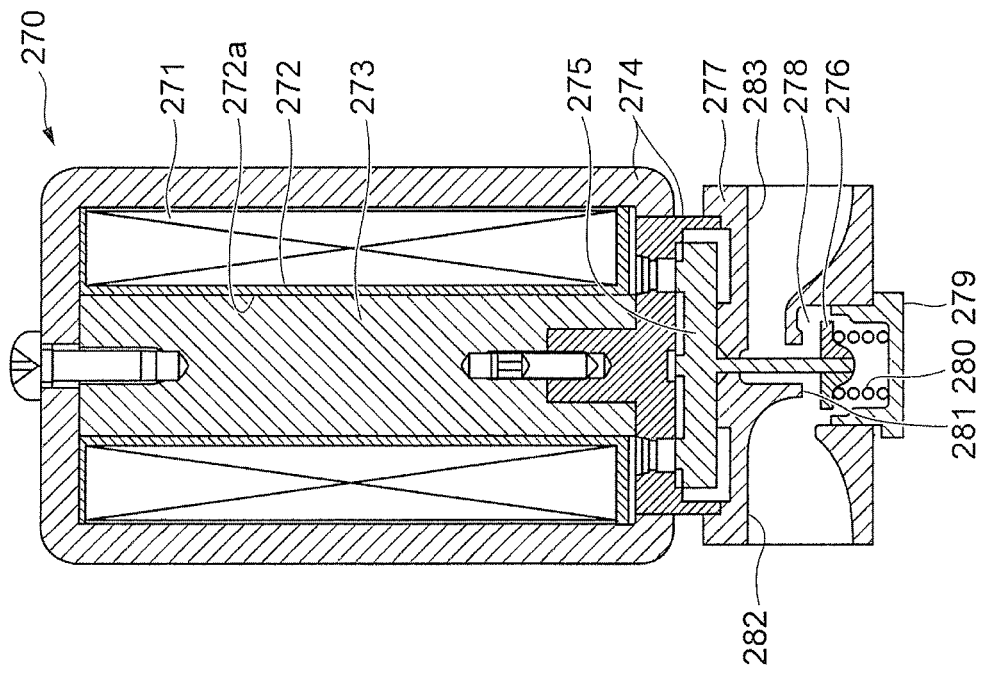

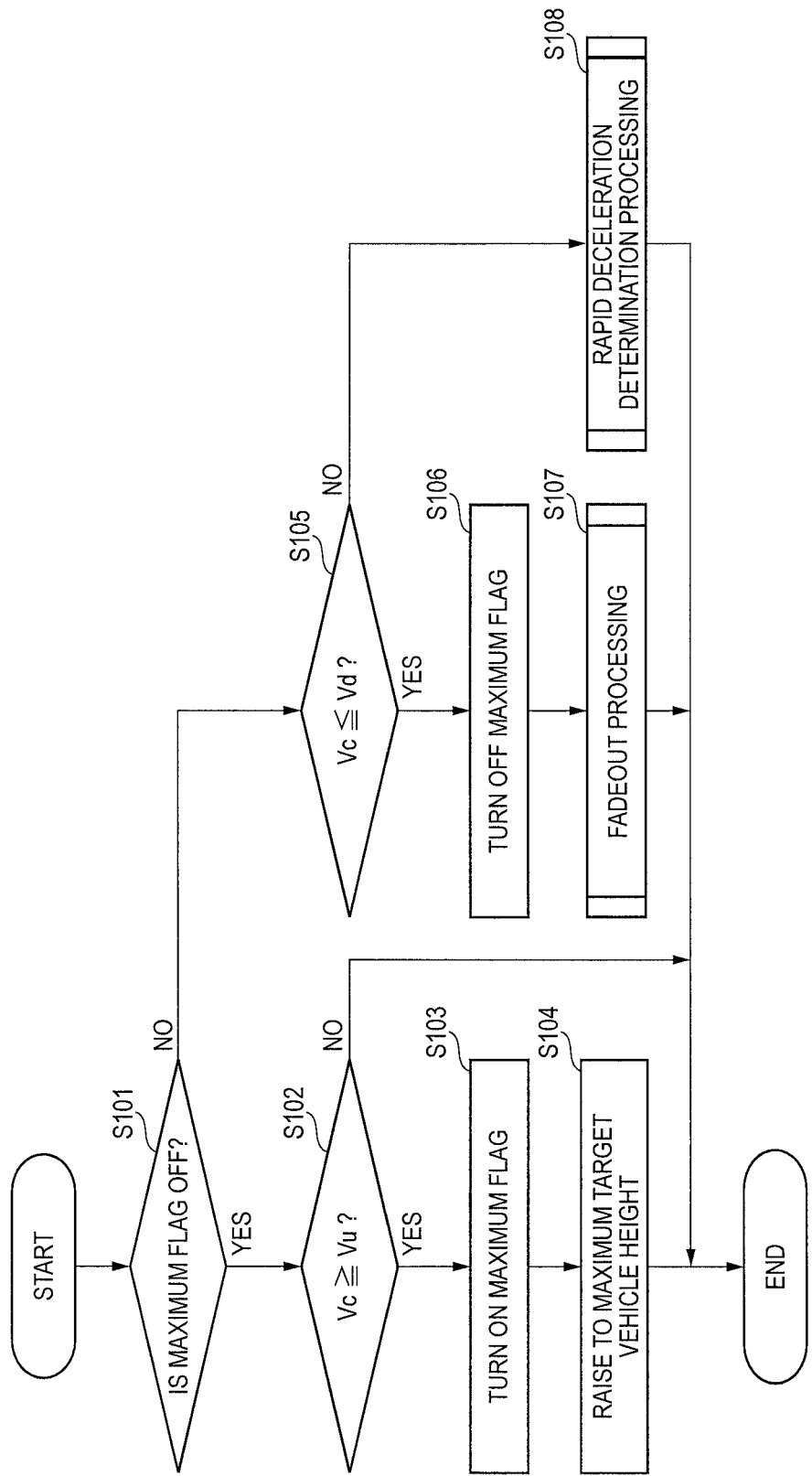

VEHICLE HEIGHT ADJUSTING DEVICE AND VEHICLE HEIGHT ADJUSTING METHOD

CROSS-REFERENCE TO RELATED APPLICATIONS

This application is based on and claims priority under 35 USC 119 from Japanese Patent Application No. 2014-050673 filed on Mar. 13, 2014, the entire content of which is incorporated herein by reference.

BACKGROUND OF THE INVENTION

1. Technical Field

The present invention relates to a vehicle height adjusting device and a vehicle height adjusting method for adjusting the vehicle height of a motorcycle.

2. Related Art

In recent years, devices have been proposed for raising the vehicle height while the motorcycle is running and lowering the vehicle height while the motorcycle is stopped for facilitating the process of mounting and dismounting a motorcycle.

For example, the vehicle height adjusting device described in Patent Literature 1 (JP-B-H08-22680) automatically changes the vehicle height in response to the vehicle speed of the motorcycle, automatically raises the vehicle height when the vehicle speed reaches a setting speed, and automatically lowers the vehicle height when the vehicle speed falls below a setting speed. Moreover, the vehicle height adjusting device described in Patent Literature 2 (JP-A-2014-8889) lowers the vehicle height when the estimated stopping time falls below a predetermined reference stopping time.

SUMMARY OF THE INVENTION

With the configuration where the vehicle height is simply lowered when the vehicle speed falls below a setting speed, for example, when stopping the motorcycle during rapid deceleration, there is a possibility that the vehicle height cannot be lowered all the way to the intended height. If the vehicle height is not lowered all the way to the intended height when the motorcycle is stopped, it will be difficult for the driver to step foot on the ground, and the mounting and dismounting of the motorcycle becomes difficult.

An object of the present invention is to provide a vehicle height adjusting device capable of lowering the vehicle height of the motorcycle to the intended height at the timing that the motorcycle stops, irrespective of the deceleration state of the motorcycle.

An aspect of the present invention provides a vehicle height adjusting device comprising a changing unit capable of changing a relative position between a vehicle body and wheels of a vehicle, and a control unit that adjusts a vehicle height, which is a height of the vehicle body, by controlling the changing unit to change the relative position, wherein the control unit changes a vehicle height change rate, which is a rate of changing the vehicle height to a target vehicle height during stoppage, on the basis of deceleration of the vehicle.

Here, the control unit may set a target vehicle height to the target vehicle height during stoppage when a vehicle speed of the vehicle is equal to or less than a lowering reference vehicle speed, and change the lowering reference vehicle speed on the basis of deceleration of the vehicle.

Moreover, the control unit may estimate an estimated stopping time on the basis of the vehicle speed and deceleration of the vehicle; and change the vehicle height change rate on the basis of a vehicle height lowering completion time which is obtained by adding or subtracting a certain time to or from the estimated stopping time.

Moreover, the control unit may estimate an estimated stopping time on the basis of the vehicle speed and deceleration of the vehicle; and change the vehicle height change rate and the lowering reference vehicle speed on the basis of a vehicle height lowering completion time which is obtained by adding or subtracting a certain time to or from the estimated stopping time.

Moreover, an upper limit is set to the lowering reference vehicle speed.

Moreover, the control unit may change the target vehicle height to the target vehicle height during stoppage at a certain vehicle height change rate when the vehicle speed is equal to or less than a certain vehicle speed.

Moreover, the control unit may set the target vehicle height to a target vehicle height during running when the estimated stopping time becomes longer than a certain set time.

Moreover, another aspect of the present invention provides a vehicle height adjusting method of adjusting a vehicle height, which is a height of a vehicle body, by changing a relative position between the vehicle body and wheels of a vehicle, wherein a vehicle height change rate, which is a rate of changing the vehicle height to a target vehicle height during stoppage, is changed on the basis of deceleration of the vehicle.

According to any one of the aspects of the present invention, it is possible to lower the vehicle height of the motorcycle to the intended height at the timing that the motorcycle stops, irrespective of the deceleration state of the motorcycle.

BRIEF DESCRIPTION OF THE DRAWINGS

FIGS. 3A and 3B are diagrams explaining the operation of the rear wheel side liquid supplying device;

FIGS. 4A and 4B are diagrams explaining the vehicle height adjustment performed by the rear wheel side relative position changing device;

FIGS. 7A and 7B are diagrams explaining the operation of the front wheel side liquid supplying device;

FIG. 10A is a diagram showing a schematic configuration of the front wheel side solenoid valve, and FIG. 10B is a diagram showing a schematic configuration of the rear wheel side solenoid valve;

FIG. 15 is a flowchart showing a routine of the basic processing performed by the running state ascertaining unit;

DETAILED DESCRIPTION OF THE INVENTION

An embodiment of the present invention is now explained in detail with reference to the appended drawings.

Figure 1:
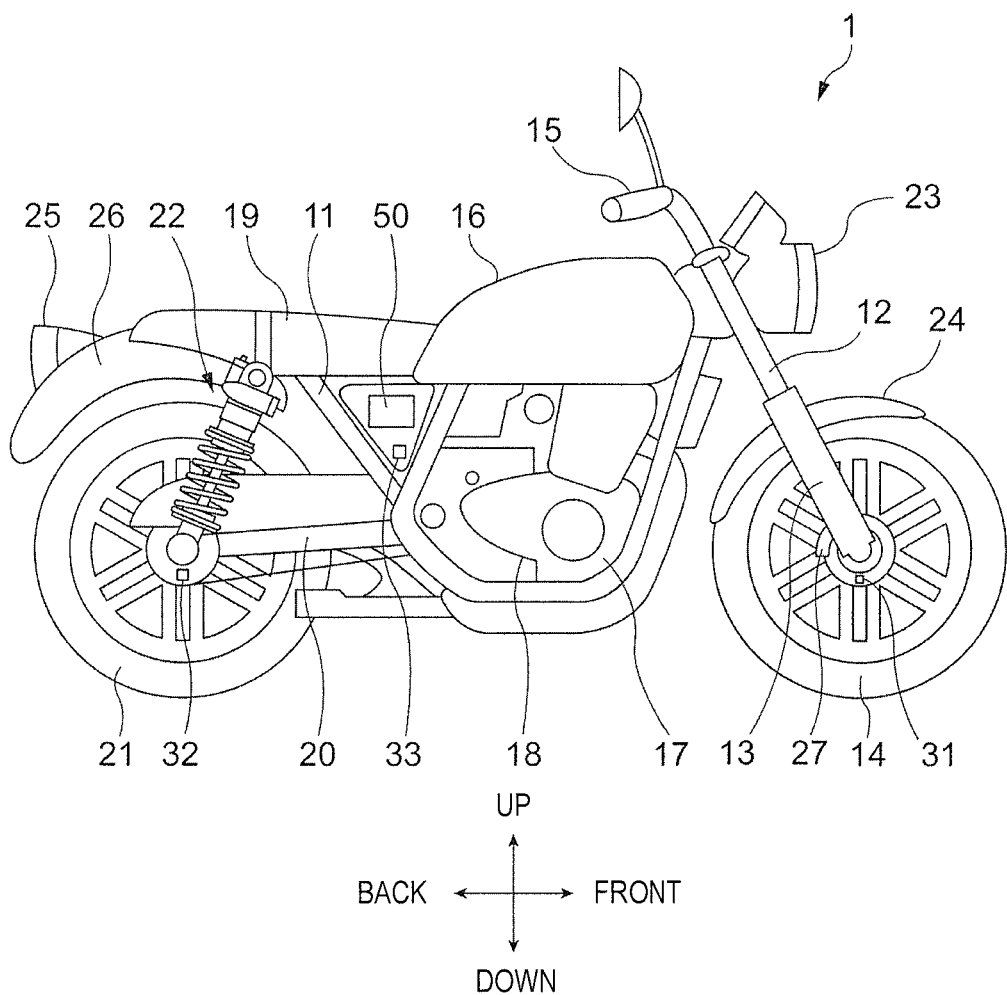
FIG. 1 is a diagram showing a schematic configuration of a motorcycle according to an embodiment of the present invention.

FIG. 1 is a diagram showing a schematic configuration of a motorcycle 1 according to an embodiment of the present invention.

As shown in FIG. 1, the motorcycle 1 includes a vehicle body frame 11, a head tube 12 that is mounted on a front end part of the vehicle body frame 11, two front forks 13 provided to the head tube 12, and a front wheel 14 mounted on a lower end of the two front forks 13. The two front forks 13 are each disposed on the left side and the right side of the front wheel 14, respectively. In FIG. 1, only the front fork 13 disposed on the right side is shown. The specific configuration of the front fork 13 will be explained in detail later.

Moreover, the motorcycle 1 includes handlebars 15 mounted on the upper part of the front forks 13, a fuel tank 16 mounted on a front upper part of the vehicle body frame 11, and an engine 17 and a transmission 18 that are disposed below the fuel tank 16.

Moreover, the motorcycle 1 includes a seat 19 mounted on a rear upper part of the vehicle body frame 11, a swing arm 20 mounted swingably on a lower part of the vehicle body frame 11, a rear wheel 21 mounted on a rear end of the swing arm 20, and one or two rear suspensions 22 mounted between a rear part (rear wheel 21) of the swing arm 20 and a rear part of the vehicle body frame 11. The one or two rear suspensions 22 are each disposed on the left side and the right side of the rear wheel 21, respectively. In FIG. 1, only the rear suspension 22 disposed on the right side is shown. The specific configuration of the rear suspension 22 will be explained in detail later.

Moreover, the motorcycle 1 includes a headlamp 23 disposed in front of the head tube 12, a front fender 24 mounted on the front forks 13 so as to cover the upper part of the front wheel 14, a tail lamp 25 disposed behind the seat 19, and a rear fender 26 mounted below the tail lamp 25 so as to cover the upper part of the rear wheel 21. Moreover, the motorcycle 1 includes a brake 27 for stopping the rotation of the front wheel 14.

Moreover, the motorcycle 1 includes a front wheel rotation detection sensor 31 for detecting a rotation angle of the front wheel 14, and a rear wheel rotation detection sensor 32 for detecting a rotation angle of the rear wheel 21. Moreover, the motorcycle 1 includes a load detection sensor 33 for detecting a load that is generated from the vehicle body frame 11 to the front wheel 14 and the rear wheel 21 as a result of a passenger mounting the seat 19 or luggage being placed on the seat 19.

Moreover, the motorcycle 1 comprises a control device 50 as one example of the control unit configured to control the vehicle height of the motorcycle 1 by controlling the opening of a front wheel side solenoid valve 270 (described later) of the front fork 13 and the opening of a rear wheel side solenoid valve 170 (described later) of the of the rear suspension 22.

The control device 50 controls the vehicle height of the motorcycle 1 by controlling the opening of the front wheel side solenoid valve 270 and the rear wheel side solenoid valve 170. Input to the control device 50 are output signals from the foregoing front wheel rotation detection sensor 31, rear wheel rotation detection sensor 32, load detection sensor 33, and other sensors.

The rear suspension 22 is now explained in detail.

Figure 2:
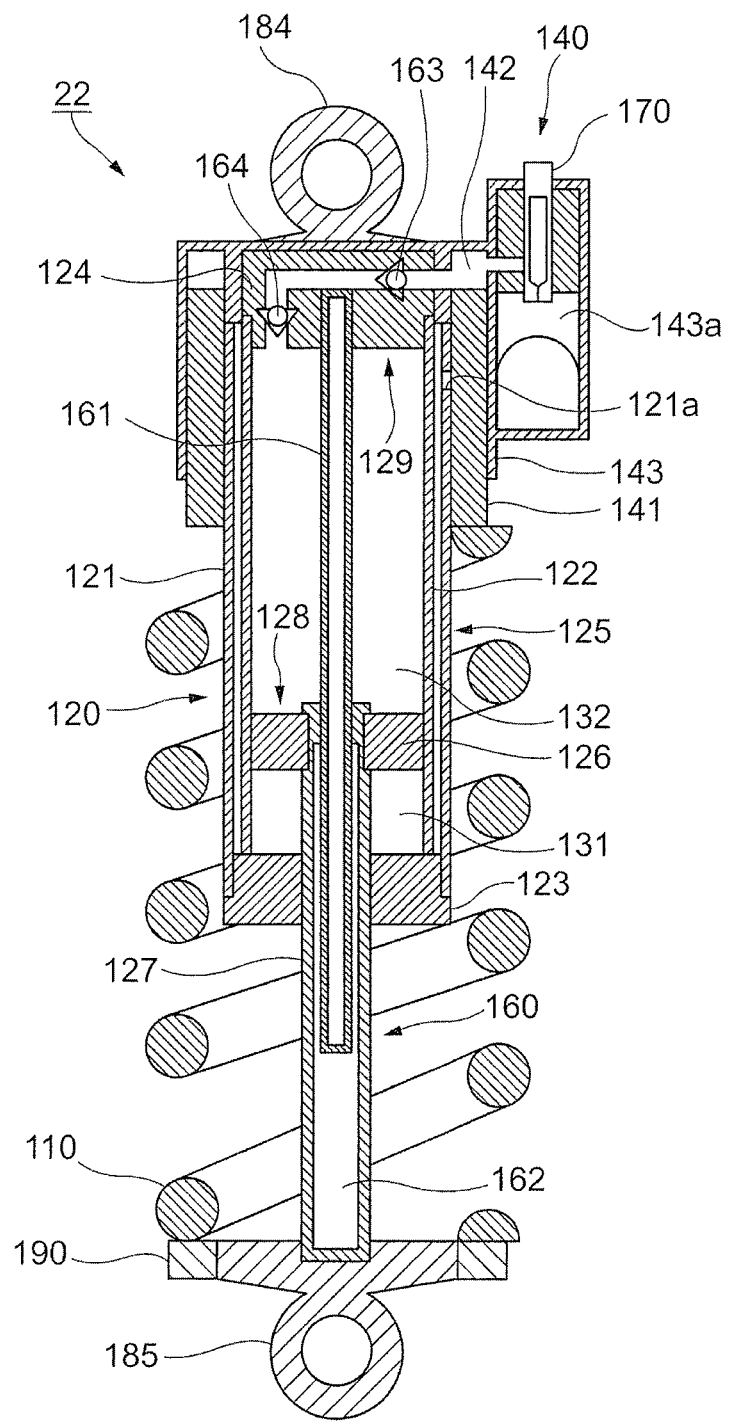
FIG. 2 is a cross section of the rear suspension.

FIG. 2 is a cross section of the rear suspension 22.

The rear suspension 22 is mounted between the vehicle body frame 11, which is an example of the vehicle body of the motorcycle 1, and the rear wheel 21. The rear suspension 22 comprises a rear wheel side suspension spring 110 as an example of a spring for supporting the weight of the motorcycle 1 and absorbing shocks, and a rear wheel side damper 120 as an example of a damper for damping the vibration of the rear wheel side suspension spring 110. Moreover, the rear suspension 22 comprises a rear wheel side relative position changing device 140 capable of changing a rear wheel side relative position, which is the relative position between the vehicle body frame 11 and the rear wheel 21, by adjusting the spring force of the rear wheel side suspension spring 110, and a rear wheel side liquid supplying device 160 for supplying liquid to the rear wheel side relative position changing device 140. Moreover, the rear suspension 22 comprises a vehicle body side mounting member 184 for mounting the rear suspension 22 on the vehicle body frame 11, an axle side mounting member 185 for mounting the rear suspension 22 on the rear wheel 21, and a spring bearing 190 for supporting one end (lower part in FIG. 2) in a centerline direction of the rear wheel side suspension spring 110 mounted on the axle side mounting member 185. The rear suspension 22 functions as an example of the changing unit configured to change the relative position between the vehicle body frame 11 and the rear wheel 21.

The rear wheel side damper 120 comprises, as shown in FIG. 2, a cylinder 125 including a thin cylindrical external cylinder 121, a thin cylindrical internal cylinder 122 housed in the external cylinder 121, a bottom cover 123 that covers one end (lower part in FIG. 2) in a cylindrical centerline direction (vertical direction in FIG. 2) of the cylindrical external cylinder 121, and a top cover 124 that covers the other end (upper part in FIG. 2) in the centerline direction of the internal cylinder 122. In the ensuing explanation, the cylindrical centerline direction of the external cylinder 121 is simply referred to as the "centerline direction".

Moreover, the rear wheel side damper 120 comprises a piston 126 that is inserted into the internal cylinder 122 movably in the centerline direction, and a piston rod 127 that extends in the centerline direction and supports the piston 126 with the other end (upper part in FIG. 2) in the centerline direction. The piston 126 comes into contact with the inner peripheral surface of the internal cylinder 122, and partitions the space where the liquid (oil in this embodiment) in the cylinder 125 is enclosed into a first oil chamber 131 on one end side that is more toward the centerline direction than the piston 126, and a second oil chamber 132 on the other end side that is more toward the centerline direction than the piston 126. The piston rod 127 is a cylindrical member, and a pipe 161 described later is inserted therein.

Moreover, the rear wheel side damper 120 comprises a first damping force generation unit 128 disposed on the other end side in the centerline direction of the piston rod 127, and a second damping force generation unit 129 disposed on the other end side in the centerline direction of the internal cylinder 122. The first damping force generation unit 128 and the second damping force generation unit 129 damp the stretching vibration of the cylinder 125 and the piston rod 127 associated with the absorption of the impact force from the road surface by the rear wheel side suspension spring 110. The first damping force generation unit 128 is disposed to function as a communicating path between the first oil chamber 131 and the second oil chamber 132, and the second damping force generation unit 129 is disposed to function as a communicating path between the second oil chamber 132 and a jack chamber 142 (described later) of the rear wheel side relative position changing device 140.

The rear wheel side liquid supplying device 160 is a device for supplying liquid into the jack chamber 142 (described later) of the rear wheel side relative position changing device 140 via a pumping operation based on the telescopic motion of the piston rod 127 relative to the cylinder 125.

The rear wheel side liquid supplying device 160 includes a cylindrical pipe 161 that is fixed to the top cover 124 of the rear wheel side damper 120 in a manner of extending in the centerline direction. The pipe 161 is coaxially inserted into the pump chamber 162, which is the inside of the cylindrical piston rod 127.

Moreover, the rear wheel side liquid supplying device 160 includes a discharge check valve 163 for discharging, toward the jack chamber 142 described later, the liquid in the pump chamber 162 that is pressurized by the movement of the piston rod 127 in the direction of entering the cylinder 125 and the pipe 161, and a suction check valve 164 for sucking the liquid in the cylinder 125 into the pump chamber 162 which becomes a negative pressure by the movement of the piston rod 127 in the direction of exiting from the cylinder 125 and the pipe 161.

FIG. 3A and FIG. 3B are diagrams explaining the operation of the rear wheel side liquid supplying device 160.

When the motorcycle 1 is driven and the rear suspension 22 receives force from a bumpy road surface, the rear wheel side liquid supplying device 160 configured as described above performs a pumping operation based on a telescopic motion where the piston rod 127 enters and exits the cylinder 125 and the pipe 161. When the pump chamber 162 is pressurized by this pumping operation, the liquid in the pump chamber 162 opens the discharge check valve 163 and is discharged toward the jack chamber 142 of the rear wheel side relative position changing device 140 (refer to FIG. 3A), and when the pump chamber 162 becomes a negative pressure, the liquid in the second oil chamber 132 of the cylinder 125 opens the suction check valve 164 and gets sucked into the pump chamber 162 (refer to FIG. 3B).

The rear wheel side relative position changing device 140 includes a supporting member 141 that is disposed so as to cover the outer periphery of the cylinder 125 of the rear wheel side damper 120 and supports the other end (upper part in FIGS. 3A and 3B) in the centerline direction of the rear wheel side suspension spring 110, and a hydraulic jack 143 that is disposed so as to cover the outer periphery of the other end side (upper side in FIGS. 3A and 3B) in the centerline direction of the cylinder 125 and forms the jack chamber 142 together with the supporting member 141. When the liquid in the cylinder 125 is filled in the jack chamber 142 as an example of the hydraulic oil chamber or the liquid is discharged from inside the jack chamber 142, the supporting member 141 moves in the centerline direction relative to the hydraulic jack 143. The vehicle body side mounting member 184 is mounted on the upper part of the hydraulic jack 143, the spring force of the rear wheel side suspension spring 110 changes when the supporting member 141 moves in the centerline direction relative to the hydraulic jack 143 and, consequently, the relative position of the seat 19 relative to the rear wheel 21 also changes.

Moreover, the rear wheel side relative position changing device 140 includes a rear wheel side solenoid valve 170 as a solenoid valve that is provided on a fluid distribution channel between the jack chamber 142 and the liquid retaining chamber 143a formed in the hydraulic jack 143, and which is opened to accumulate, in the jack chamber 142, the liquid that was supplied to the jack chamber 142, and closed to discharge, to the liquid retaining chamber 143a formed in the hydraulic jack 143, the liquid that was supplied to the jack chamber 142. The rear wheel side solenoid valve 170 will be described in detail later. Note that the liquid discharged to the liquid retaining chamber 143a is returned inside the cylinder 125.

FIG. 4A and FIG. 4B are diagrams explaining the vehicle height adjustment performed by the rear wheel side relative position changing device 140.

When liquid is supplied into the jack chamber 142 by the rear wheel side liquid supplying device 160 in a state where the rear wheel side solenoid valve 170 is even slightly closed from its fully open state, the liquid is filled in the jack chamber 142, the supporting member 141 moves to one end side (lower side in FIG. 4A) in the centerline direction relative to the hydraulic jack 143, and the spring length of the rear wheel side suspension spring 110 becomes shorter (refer to FIG. 4A). Meanwhile, when the rear wheel side solenoid valve 170 is opened fully, the liquid in the jack chamber 142 is discharged to the liquid retaining chamber 143a, the supporting member 141 moves to the other end side (upper side in FIG. 4B) in the centerline direction relative to the hydraulic jack 143, and the spring length of the rear wheel side suspension spring 110 becomes longer (refer to FIG. 4B).

When the spring length of the rear wheel side suspension spring 110 becomes shorter as a result of the supporting member 141 moving relative to the hydraulic jack 143, the spring force of the rear wheel side suspension spring 110 pressing the supporting member 141 becomes greater in comparison to the time before the supporting member 141 moved relative to the hydraulic jack 143. Consequently, even when force works from the vehicle body frame 11 toward the rear wheel 21, the initial set load that does not change the relative position of the two is switched. In the foregoing case, when the same force works from the vehicle body frame 11 (seat 19) to the one end side (lower side in FIG. 4A and FIG. 4B) in the centerline direction, the subduction level (change in the distance between the vehicle body side mounting member 184 and the axle side mounting member 185) of the rear suspension 22 will decrease. Thus, when the spring length of the rear wheel side suspension spring 110 becomes shorter as a result of the supporting member 141 moving relative to the hydraulic jack 143, the height of the seat 19 will increase (vehicle height will increase) in comparison to the time before the supporting member 141 moved relative to the hydraulic jack 143. In other words, the vehicle height increases by reducing the opening of the rear wheel side solenoid valve 170.

Meanwhile, when the spring length of the rear wheel side suspension spring 110 becomes longer as a result of the supporting member 141 moving relative to the hydraulic jack 143, the spring force of the rear wheel side suspension spring 110 pressing the supporting member 141 becomes smaller in comparison to the time before the supporting member 141 moved relative to the hydraulic jack 143. In the foregoing case, when the same force works from the vehicle body frame 11 (seat 19) to the one end side (lower side in FIG. 4A and FIG. 4B) in the centerline direction, the subduction level (change in the distance between the vehicle body side mounting member 184 and the axle side mounting member 185) of the rear suspension 22 will increase. Thus, when the spring length of the rear wheel side suspension spring 110 becomes longer as a result of the supporting member 141 moving relative to the hydraulic jack 143, the height of the seat 19 will decrease (vehicle height will decrease) in comparison to the time before the supporting member 141 moved relative to the hydraulic jack 143. In other words, the vehicle height decreases by increasing the opening of the rear wheel side solenoid valve 170.

Note that the opening of the rear wheel side solenoid valve 170 is controlled by the control device 50.

Moreover, when the rear wheel side solenoid valve 170 is opened, the destination of discharging the liquid supplied to the jack chamber 142 may also be the first oil chamber 131 and/or the second oil chamber 132 in the cylinder 125.

Moreover, as shown in FIG. 2, formed on the external cylinder 121 of the cylinder 125 is a return path 121a for returning the liquid in the jack chamber 142 into the cylinder 125 when the supporting member 141 moves up to a predetermined limit position on the one end side (lower side in FIG. 2) in the centerline direction relative to the hydraulic jack 143.

Figure 5:
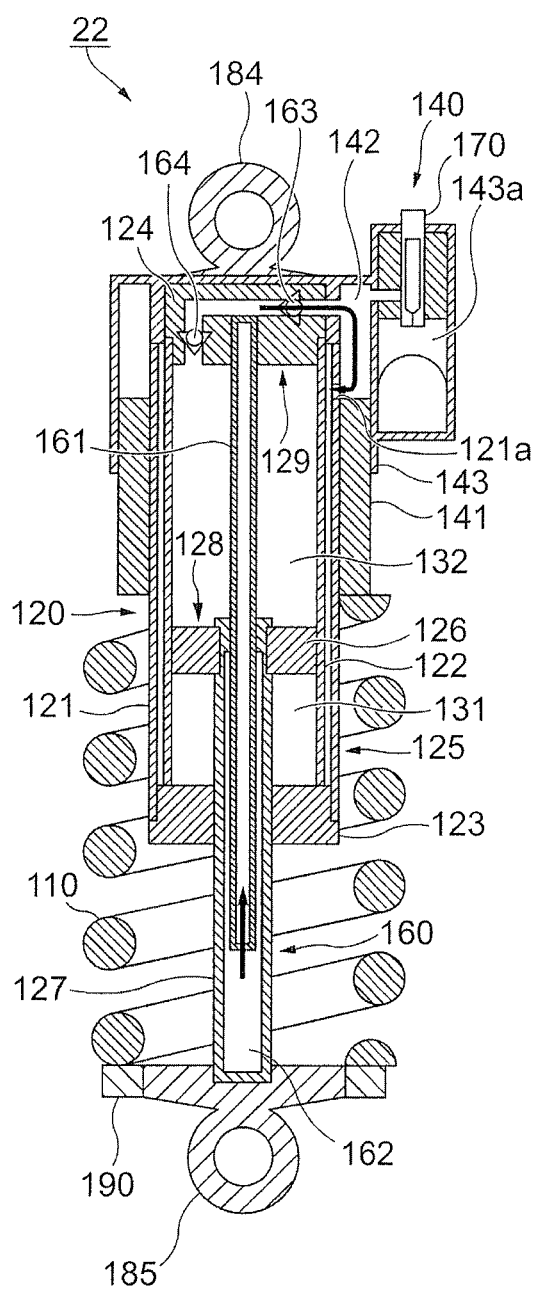
FIG. 5 is a diagram showing the mechanism for maintaining the vehicle height.

FIG. 5 is a diagram showing the mechanism for maintaining the vehicle height.

Even when the liquid is continuously supplied into the jack chamber 142 via the return path 121a when the rear wheel side solenoid valve 170 is fully open, since the supplied liquid is returned into the cylinder 125, the position of the supporting member 141 relative to the hydraulic jack 143, and by extension the height of the seat 19 (vehicle height), is maintained.

Note that, in the ensuing explanation, the state of the rear suspension 22 when the rear wheel side solenoid valve 170 is fully open and the moving distance of the supporting member 141 relative to the hydraulic jack 143 is minimum (zero) is referred to as the "minimum state," and the state of the rear suspension 22 when the rear wheel side solenoid valve 170 is fully closed and the moving distance of the supporting member 141 relative to the hydraulic jack 143 is maximum is referred to as the "maximum state."

Figure 11:
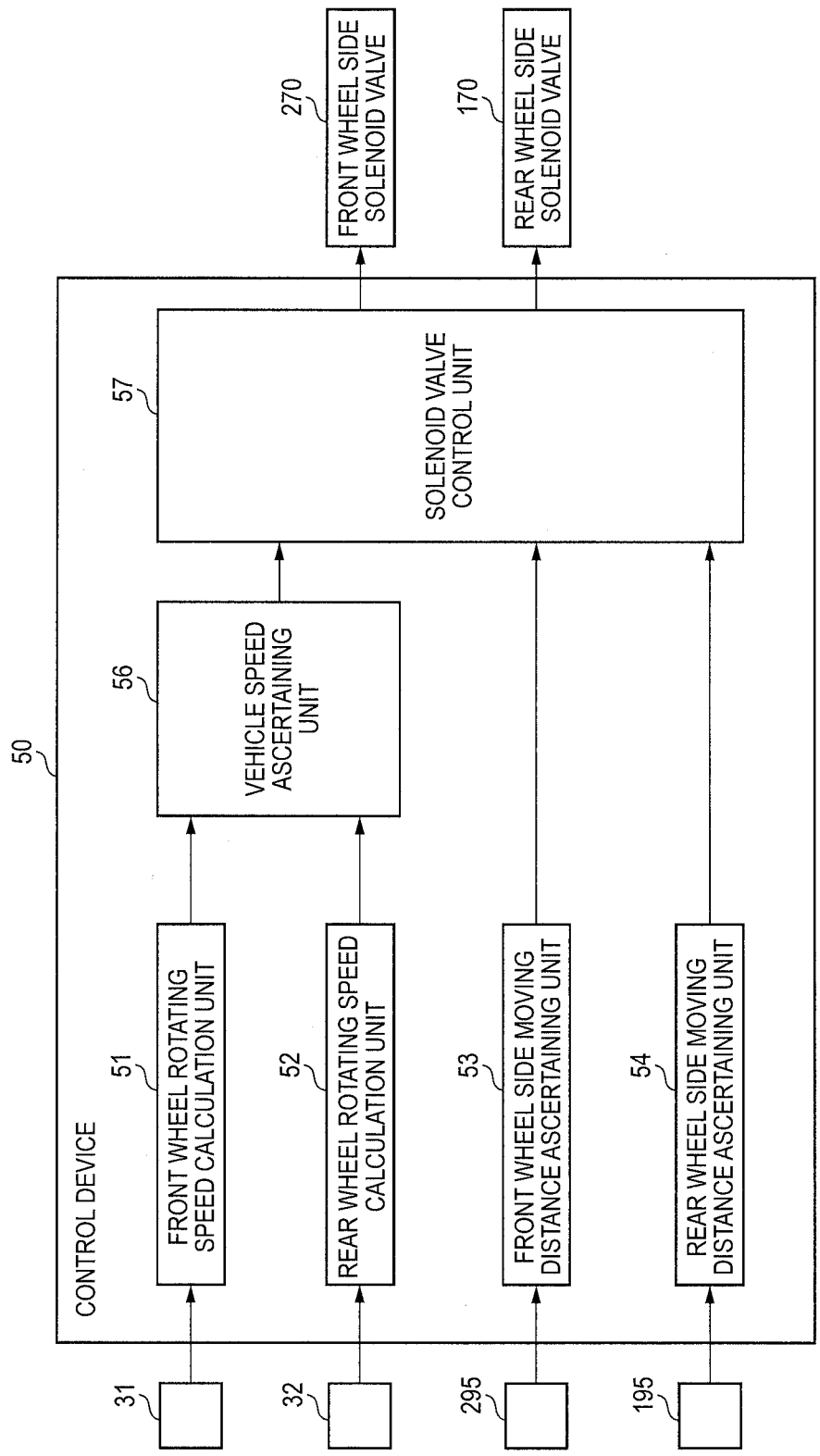
FIG. 11 is a block diagram of the control device.

Moreover, the rear suspension 22 includes a rear wheel side relative position detection unit 195 (refer to FIG. 11). As the rear wheel side relative position detection unit 195, exemplified may be a unit capable of detecting the moving distance of the supporting member 141 in the centerline direction relative to the hydraulic jack 143; that is, the moving distance of the supporting member 141 in the centerline direction relative to the vehicle body side mounting member 184. Specifically, exemplified may be case of winding a coil around the outer peripheral surface of the supporting member 141 and configuring the hydraulic jack 143 from a magnetic body, and using a unit capable of detecting the moving distance of the supporting member 141 on the basis of the impedance of the coil that changes according to the movement of the supporting member 141 in the centerline direction relative to the hydraulic jack 143.

The front fork 13 is now explained in detail.

Figure 6:
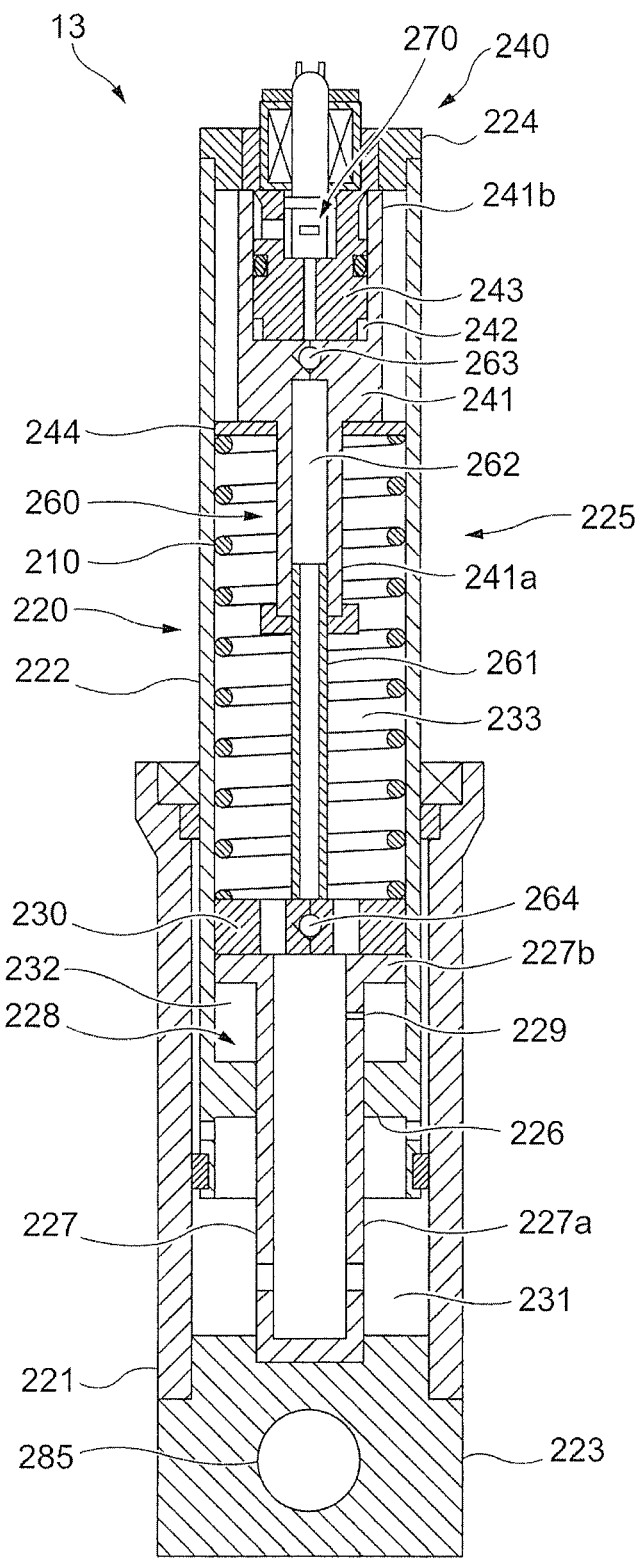
FIG. 6 is a cross section of the front fork.

FIG. 6 is a cross section of the front fork 13.

The front fork 13 is mounted between the vehicle body frame 11 and the front wheel 14. The front fork 13 comprises a front wheel side suspension spring 210 as an example of a spring that supports the weight of the motorcycle 1 and absorbs shocks, and a front wheel side damper 220 as an example of a damper for damping the vibration of the front wheel side suspension spring 210. Moreover, the front fork 13 comprises a front wheel side relative position changing device 240 capable of changing the front wheel side relative position, which is the relative position between the vehicle body frame 11 and the front wheel 14, by adjusting the spring force of the front wheel side suspension spring 210, and a front wheel side liquid supplying device 260 for supplying liquid to the front wheel side relative position changing device 240. Moreover, the front fork 13 comprises an axle side mounting part 285 for mounting the front fork 13 on the front wheel 14, and a head tube-side mounting part (not shown) for mounting the front fork 13 on the head tube 12. The front fork 13 functions as an example of the changing unit configured to change the relative position between the vehicle body frame 11 and the front wheel 14.

The front wheel side damper 220 comprises, as shown in FIG. 6, a cylinder 225 including a thin cylindrical external cylinder 221, a thin cylindrical internal cylinder 222 inserted from the other end (upper part in FIG. 6) to the one end (lower part in FIG. 6) in the centerline direction (vertical direction in FIG. 6) of the cylindrical external cylinder 221, a bottom cover 223 that covers the one end (lower part in FIG. 6) in the centerline direction of the external cylinder 221, and a top cover 224 that covers the other end (upper part in FIG. 6) in the centerline direction of the internal cylinder 222. The internal cylinder 222 is inserted in a slidable manner relative to the external cylinder 221.

Moreover, the front wheel side damper 220 comprises a piston rod 227 mounted on the bottom cover 223 so as to extend in the centerline direction. The piston rod 227 includes a cylindrical part 227a of a cylindrical shape extending in the centerline direction, and a disk-shaped flange part 227b provided to the other end (upper part in FIG. 6) in the centerline direction of the cylindrical part 227a.

Moreover, the front wheel side damper 220 comprises a piston 226 that is fixed to one end side (lower part side in FIG. 6) in the centerline direction of the internal cylinder 222, and slidable relative to the outer periphery of the cylindrical part 227a of the piston rod 227. The piston 226 comes into contact with the outer peripheral surface of the cylindrical part 227a of the piston rod 227, and partitions the space where the liquid (oil in this embodiment) in the cylinder 225 is enclosed into a first oil chamber 231 on one end side that is more toward the centerline direction than the piston 226, and a second oil chamber 232 on the other end side that is more toward the centerline direction than the piston 226.

Moreover, the front wheel side damper 220 comprises a cover member 230 that is provided above the piston rod 227 and covers the opening of the cylindrical part 227a of the piston rod 227. The cover member 230 supports one end (lower part in FIG. 6) in the centerline direction of the front wheel side suspension spring 210. The front wheel side damper 220 includes an oil reservoir chamber 233 formed in the space on the other end side that is more in the centerline direction than the cover member 230 in the internal cylinder 222 and in the internal space of the cylindrical part 227a of the piston rod 227. The oil reservoir chamber 233 is constantly in communication with the first oil chamber 231 and the second oil chamber 232.

Moreover, the front wheel side damper 220 comprises a first damping force generation unit 228 provided to the piston 226, and a second damping force generation unit 229 formed on the piston rod 227. The first damping force generation unit 228 and the second damping force generation unit 229 dampen the stretching vibration of the internal cylinder 222 and the piston rod 227 associated with the absorption of the impact force from the road surface by the front wheel side suspension spring 210. The first damping force generation unit 228 is disposed so as to function as a communicating path between the first oil chamber 231 and the second oil chamber 232, and the second damping force generation unit 229 is formed so as to function as a communicating path between the first oil chamber 231, the second oil chamber 232 and the oil reservoir chamber 233.

The front wheel side liquid supplying device 260 is a device for supplying liquid into the jack chamber 242 (described later) of the front wheel side relative position changing device 240 via a pumping operation based on the telescopic motion of the piston rod 227 relative to the internal cylinder 222.

The front wheel side liquid supplying device 260 includes a cylindrical pipe 261 that is fixed to the cover member 230 of the front wheel side damper 220 in a manner of extending in the centerline direction. The pipe 261 is coaxially inserted into the pump chamber 262, which is the inside of the lower cylindrical part 241a of the supporting member 241 of the front wheel side relative position changing device 240 described later.

Moreover, the front wheel side liquid supplying device 260 includes a discharge check valve 263 for discharging, toward the jack chamber 242 described later, the liquid in the pump chamber 262 that is pressurized by the movement of the piston rod 227 in the direction of entering the internal cylinder 222, and a suction check valve 264 for sucking the liquid in the oil reservoir chamber 233 into the pump chamber 262 which becomes a negative pressure by the movement of the piston rod 227 in the direction of exiting from the internal cylinder 222.

FIG. 7A and FIG. 7B are diagrams explaining the operation of the front wheel side liquid supplying device 260.

When the motorcycle 1 is driven and the front fork 13 receives force from a bumpy road surface, the front wheel side liquid supplying device 260 configured as described above performs a pumping operation based on a telescopic motion where the piston rod 227 enters and exits the internal cylinder 222 and the pipe 261 enters and exits the supporting member 241 of the front wheel side relative position changing device 240. When the pump chamber 262 is pressurized by this pumping operation, the liquid in the pump chamber 262 opens the discharge check valve 263 and is discharged toward the jack chamber 242 of the front wheel side relative position changing device 240 (refer to FIG. 7A), and when the pump chamber 262 becomes a negative pressure, the liquid in the oil reservoir chamber 233 opens the suction check valve 264 and gets sucked into the pump chamber 262 (refer to FIG. 7B).

The front wheel side relative position changing device 240 comprises a supporting member 241 that is disposed inside the internal cylinder 222 of the front wheel side damper 220, and supports the other end (upper part in FIGS. 7A and 7B) in the centerline direction of the front wheel side suspension spring 210 via the disk-shaped spring bearing 244. The supporting member 241 includes a lower cylindrical part 241a formed in a cylindrical shape on one end side (lower side in FIGS. 7A and 7B) in the centerline direction, and an upper cylindrical part 241b formed in a cylindrical shape on the other end side (upper side in FIGS. 7A and 7B) in the centerline direction. A pipe 261 is inserted into the lower cylindrical part 241a.

Moreover, the front wheel side relative position changing device 240 includes a hydraulic jack 243 that is fitted into the upper cylindrical part 241b of the supporting member 241 and forms the jack chamber 242 together with the supporting member 241. When the liquid in the cylinder 225 is filled in the jack chamber 242 as an example of the hydraulic oil chamber or the liquid is discharged from inside the jack chamber 242, the supporting member 241 moves in the centerline direction relative to the hydraulic jack 243. A head tube-side mounting part (not shown) is mounted on the upper part of the hydraulic jack 243, the spring force of the front wheel side suspension spring 210 changes when the supporting member 241 moves in the centerline direction relative to the hydraulic jack 243 and, consequently, the relative position of the seat 19 relative to the front wheel 14 also changes.

Moreover, the front wheel side relative position changing device 240 includes a front wheel side solenoid valve 270 as a solenoid valve that is provided on a fluid distribution channel between the jack chamber 242 and the oil reservoir chamber 233, and which is opened to accumulate, in the jack chamber 242, the liquid that was supplied to the jack chamber 242, and closed to discharge, to the oil reservoir chamber 233, the liquid that was supplied to the jack chamber 242. The front wheel side solenoid valve 270 will be described in detail later.

Figure 8A:
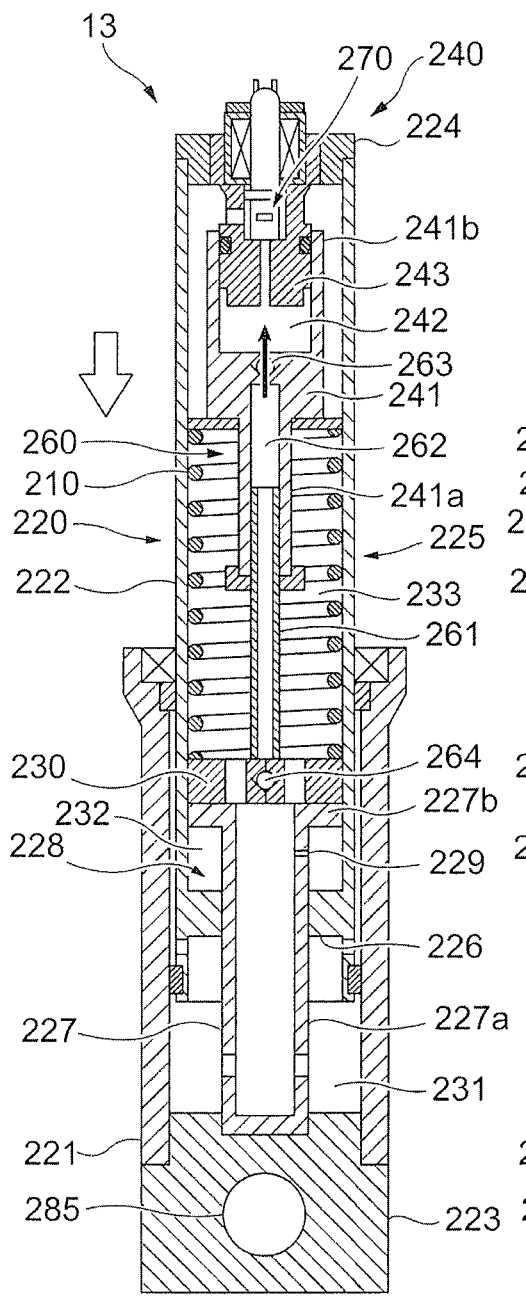
FIGS. 8A and 8B are diagrams explaining the vehicle height adjustment performed by the front wheel side relative position changing device.
Figure 8B:
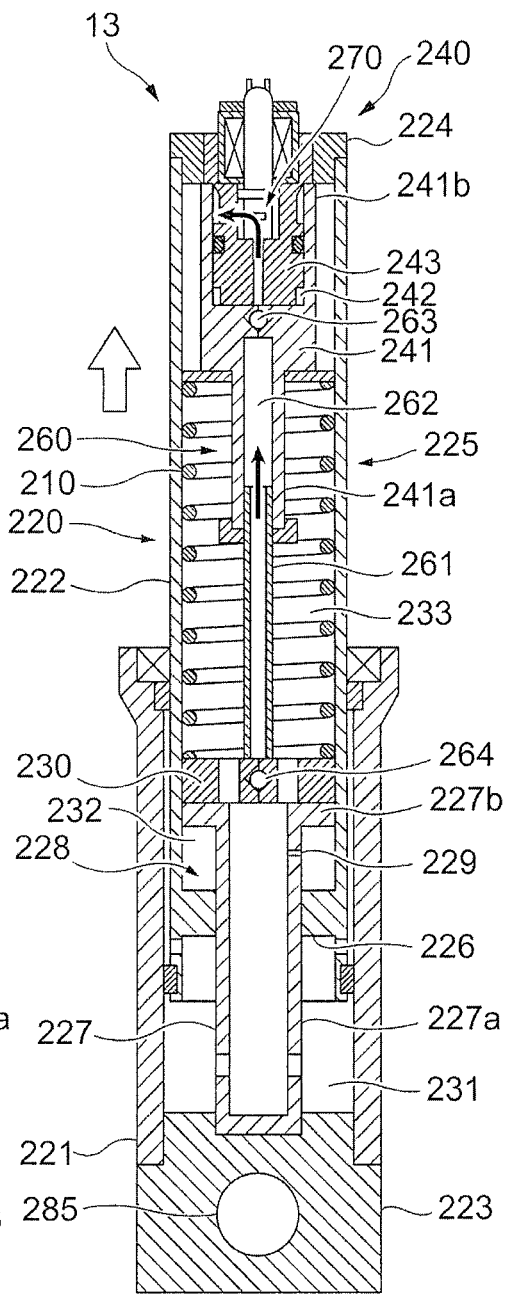

FIG. 8A and FIG. 8B are diagrams explaining the vehicle height adjustment performed by the front wheel side relative position changing device 240.

When liquid is supplied into the jack chamber 242 by the front wheel side liquid supplying device 260 in a state where the front wheel side solenoid valve 270 is even slightly closed from its fully open state, the liquid is filled in the jack chamber 242, the supporting member 241 moves to one end side (lower side in FIG. 8A) in the centerline direction relative to the hydraulic jack 243, and the spring length of the front wheel side suspension spring 210 becomes shorter (refer to FIG. 8A). Meanwhile, when the front wheel side solenoid valve 270 is opened fully, the liquid in the jack chamber 242 is discharged to the oil reservoir chamber 233, the supporting member 241 moves to the other end side (upper side in FIG. 8B) in the centerline direction relative to the hydraulic jack 243, and the spring length of the front wheel side suspension spring 210 becomes longer (refer to FIG. 8B).

When the spring length of the front wheel side suspension spring 210 becomes shorter as a result of the supporting member 241 moving relative to the hydraulic jack 243, the spring force of the front wheel side suspension spring 210 pressing the supporting member 241 becomes greater in comparison to the time before the supporting member 241 moved relative to the hydraulic jack 243. Consequently, even when force works from the vehicle body frame 11 toward the front wheel 14, the initial set load that does not change the relative position of the two is switched. In the foregoing case, when the same force works from the vehicle body frame 11 (seat 19) to the one end side (lower side in FIG. 8A and FIG. 8B) in the centerline direction, the subduction level (change in the distance between the head tube-side mounting part (not shown) and the axle side mounting part 285) of the front fork 13 will decrease. Thus, when the spring length of the front wheel side suspension spring 210 becomes shorter as a result of the supporting member 241 moving relative to the hydraulic jack 243, the height of the seat 19 will increase (vehicle height will increase) in comparison to the time before the supporting member 241 moved relative to the hydraulic jack 243. In other words, the vehicle height increases by reducing the opening of the front wheel side solenoid valve 270.

Meanwhile, when the spring length of the front wheel side suspension spring 210 becomes longer as a result of the supporting member 241 moving relative to the hydraulic jack 243, the spring force of the front wheel side suspension spring 210 pressing the supporting member 241 becomes smaller in comparison to the time before the supporting member 241 moved relative to the hydraulic jack 243. In the foregoing case, when the same force works from the vehicle body frame 11 (seat 19) to the one end side (lower side in FIG. 8A and FIG. 8B) in the centerline direction, the subduction level (change in the distance between the head tube-side mounting part (not shown) and the axle side mounting part 285) of the front fork 13 will increase. Thus, when the spring length of the front wheel side suspension spring 210 becomes longer as a result of the supporting member 241 moving relative to the hydraulic jack 243, the height of the seat 19 will decrease (vehicle height will decrease) in comparison to the time before the supporting member 241 moved relative to the hydraulic jack 243. In other words, the vehicle height decreases by increasing the opening of the front wheel side solenoid valve 270.

Note that the opening of the front wheel side solenoid valve 270 is controlled by the control device 50.

Moreover, when the front wheel side solenoid valve 270 is opened, the destination of discharging the liquid supplied to the jack chamber 242 may also be the first oil chamber 231 and/or the second oil chamber 232.

Figure 9:
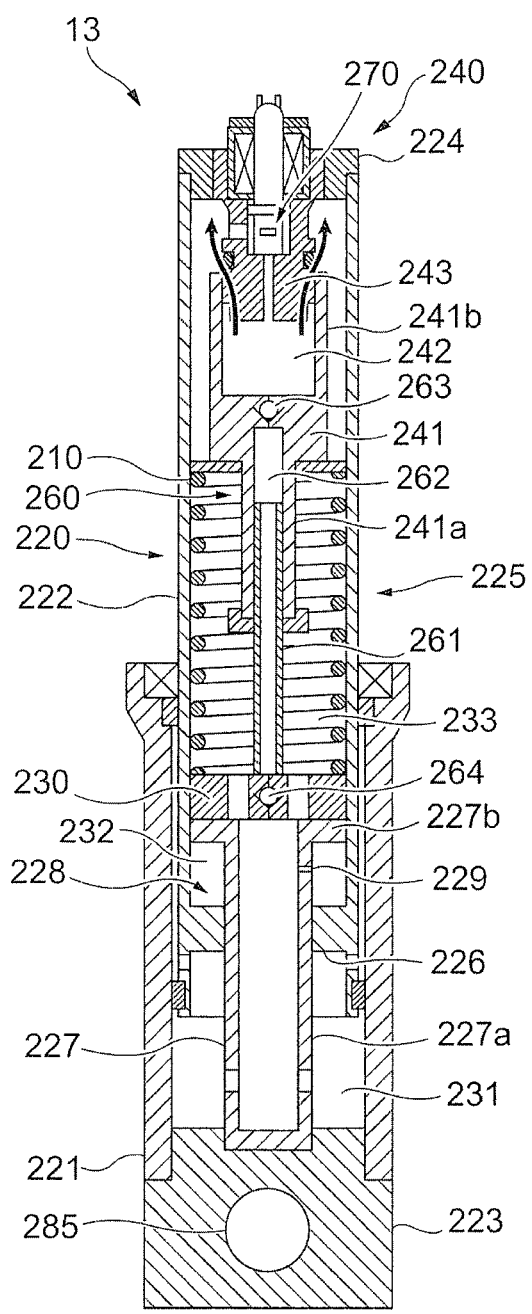
FIG. 9 is a diagram showing the mechanism for maintaining the vehicle height.

FIG. 9 is a diagram showing the mechanism for maintaining the vehicle height.

As shown in FIG. 9, formed on the outer peripheral surface of the hydraulic jack 243 is a return path (not shown) for returning the liquid in the jack chamber 242 into the oil reservoir chamber 233 when the supporting member 241 moves up to a predetermined limit position on the one end side (lower side in FIG. 8A and FIG. 8B) in the centerline direction relative to the hydraulic jack 243.

Even when the liquid is continuously supplied into the jack chamber 242 via the return path when the front wheel side solenoid valve 270 is fully open, since the supplied liquid is returned into the oil reservoir chamber 233, the position of the supporting member 241 relative to the hydraulic jack 243, and by extension the height of the seat 19 (vehicle height), is maintained.

Note that, in the ensuing explanation, the state of the front fork 13 when the front wheel side solenoid valve 270 is fully open and the moving distance of the supporting member 241 relative to the hydraulic jack 243 is minimum (zero) is referred to as the "minimum state," and the state of the front fork 13 when the front wheel side solenoid valve 270 is fully closed and the moving distance of the supporting member 241 relative to the hydraulic jack 243 is maximum is referred to as the "maximum state."

Moreover, the front fork 13 includes a front wheel side relative position detection unit 295 (refer to FIG. 11). As the front wheel side relative position detection unit 295, exemplified may be a unit capable of detecting the moving distance of the supporting member 241 in the centerline direction relative to the hydraulic jack 243; that is, the moving distance of the supporting member 241 in the centerline direction relative to the head tube-side mounting part. Specifically, exemplified may be case of winding a coil around a position corresponding to the outer peripheral surface of the internal cylinder 222 at the position in a radial direction and corresponding to the supporting member 241 at the position in the centerline direction and configuring the supporting member 241 from a magnetic body, and using a unit capable of detecting the moving distance of the supporting member 241 on the basis of the impedance of the coil that changes according to the movement of the supporting member 241 in the centerline direction relative to the hydraulic jack 243.

The schematic configuration of the front wheel side solenoid valve 270 of the front wheel side relative position changing device 240 and the rear wheel side solenoid valve 170 of the rear wheel side relative position changing device 140 is now explained.

FIG. 10A is a diagram showing a schematic configuration of the front wheel side solenoid valve 270, and FIG. 10B is a diagram showing a schematic configuration of the rear wheel side solenoid valve 170.

The front wheel side solenoid valve 270 is a so-called normally-open type solenoid valve and comprises, as shown in FIG. 10A, a bobbin 272 wound with a coil 271, a bar-shaped fixed core 273 fixed to a hollow part 272a of the bobbin 272, a holder 274 for supporting the coil 271 and the bobbin 272 and the fixed core 273, and a substantially disk-shaped moving core 275 that is disposed in correspondence with a front edge (end face) of the fixed core 273 and sucked by the fixed core 273. Moreover, the front wheel side solenoid valve 270 comprises a valve element 276 fixed to the front edge center of the moving core 275, a body 277 that is combined with the holder 274, a valve chamber 278 that is formed on the body 277 and on which a valve element 276 is disposed, a cover member 279 that covers the opening formed on the body 277 and forms the valve chamber 278 in coordination with the body 277, and a coil spring 280 disposed between the valve element 276 and the cover member 279. Moreover, the front wheel side solenoid valve 270 comprises a valve seat 281 that is formed on the body 277 and disposed in the valve chamber 278 in correspondence with the valve element 276, an introduction passage 282 that is formed on the body 277 and introduces a fluid from the jack chamber 242 (refer to FIG. 9) to the valve chamber 278, and a derivation passage 283 that is formed on the body 277 and derives the fluid from the valve chamber 278 toward the oil reservoir chamber 233 via the valve seat 281. Note that the front wheel side solenoid valve 270 may also be a normally-closed type solenoid valve.

The rear wheel side solenoid valve 170 is a so-called normally-open type solenoid valve and comprises, as shown in FIG. 10B, a bobbin 172 wound with a coil 171, a bar-shaped fixed core 173 fixed to a hollow part 172a of the bobbin 172, a holder 174 for supporting the coil 171 and the bobbin 172 and the fixed core 173, and a substantially disk-shaped moving core 175 that is disposed in correspondence with a front edge (end face) of the fixed core 173 and sucked by the fixed core 173. Moreover, the rear wheel side solenoid valve 170 comprises a valve element 176 fixed to the front edge center of the moving core 175, a body 177 that is combined with the holder 174, a valve chamber 178 that is formed on the body 177 and on which a valve element 176 is disposed, a cover member 179 that covers the opening formed on the body 177 and forms the valve chamber 178 in coordination with the body 177, and a coil spring 180 disposed between the valve element 176 and the cover member 179. Moreover, the rear wheel side solenoid valve 170 comprises a valve seat 181 that is formed on the body 177 and disposed in the valve chamber 178 in correspondence with the valve element 176, an introduction passage 182 that is formed on the body 177 and introduces a fluid from the jack chamber 142 (refer to FIG. 5) to the valve chamber 178, and a derivation passage 183 that is formed on the body 177 and derives the fluid from the valve chamber 178 toward the liquid retaining chamber 143a via the valve seat 181. Note that the rear wheel side solenoid valve 170 may also be a normally-closed type solenoid valve.

With the front wheel side solenoid valve 270 and the rear wheel side solenoid valve 170 configured as described above, during a non-conductive state where the coils 271, 171 are not conducting, the valve elements 276, 176 fixed to the front edge (end face) of the moving cores 275, 175 do not come into contact with the valve seats 281, 181 since the moving cores 275, 175 are biased downward in the diagram by the coil springs 280, 180. Thus, the introduction passages 282, 182 and the derivation passages 283, 183 are in communication, and the front wheel side solenoid valve 270 and the rear wheel side solenoid valve 170 are in an open state. Meanwhile, with the front wheel side solenoid valve 270 and the rear wheel side solenoid valve 170, during a conductive state where the coils 271, 171 are conducting, the moving cores 275, 175 become displaced due to the balance of the suction force of the fixed cores 273, 173 and the biasing force of the coil springs 280, 180 when the coils 271, 171 are excited by conduction. The front wheel side solenoid valve 270 and the rear wheel side solenoid valve 170 are configured such that the position of the valve elements 276, 176 relative to the valve seats 281, 181; that is, the opening of the valve, is adjusted. The opening of the valve is adjusted by changing the power (current, voltage) that is supplied to the coils 271, 171.

The control device 50 is now explained.

FIG. 11 is a block diagram of the control device 50.

The control device 50 comprises a CPU, a ROM storing programs to be executed by the CPU and various types of data, and a RAM that is used as a work memory of the CPU. Input to the control device 50 are output signals from the foregoing front wheel rotation detection sensor 31, rear wheel rotation detection sensor 32, front wheel side relative position detection unit 295, rear wheel side relative position detection unit 195, and other units.

The control device 50 comprises a front wheel rotating speed calculation unit 51 for calculating the rotating speed of the front wheel 14 on the basis of the output signal from the front wheel rotation detection sensor 31, and a rear wheel rotating speed calculation unit 52 for calculating the rotating speed of the rear wheel 21 on the basis of the output signal from the rear wheel rotation detection sensor 32. The front wheel rotating speed calculation unit 51 and the rear wheel rotating speed calculation unit 52 respectively ascertain the rotation angle on the basis of the pulse signal as the output signal from the sensor, and differentiate the rotation angle with the elapsed time to calculate the rotating speed.

The control device 50 comprises a front wheel side moving distance ascertaining unit 53 for ascertaining a front wheel side moving distance Lf, which is a moving distance of the supporting member 241 of the front wheel side relative position changing device 240 (refer to FIG. 8A and FIG. 8B) relative to the hydraulic jack 243, on the basis of the output signal from the front wheel side relative position detection unit 295. Moreover, the control device 50 comprises a rear wheel side moving distance ascertaining unit 54 for ascertaining a rear wheel side moving distance Lr, which is a moving distance of the supporting member 141 of the rear wheel side relative position changing device 140 relative to the hydraulic jack 143, on the basis of the output signal from the rear wheel side relative position detection unit 195. The front wheel side moving distance ascertaining unit 53 and the rear wheel side moving distance ascertaining unit 54 can respectively ascertain the front wheel side moving distance Lf and the rear wheel side moving distance Lr on the basis of the correlation between the impedance of the coil and the front wheel side moving distance Lf or the rear wheel side moving distance Lr that is stored in advance, for example, in the ROM.

Moreover, the control device 50 comprises a vehicle speed ascertaining unit 56 for ascertaining a vehicle speed Vc, which is a moving velocity of the motorcycle 1, on the basis of the rotating speed of the front wheel 14 calculated by the front wheel rotating speed calculation unit 51 and/or the rotating speed of the rear wheel 21 calculated by the rear wheel rotating speed calculation unit 52. The vehicle speed ascertaining unit 56 ascertains the vehicle speed Vc by using the front wheel rotating speed Rf or the rear wheel rotating speed Rr and calculating the moving velocity of the front wheel 14 or the rear wheel 21. The moving velocity of the front wheel 14 can be calculated by using the front wheel rotating speed Rf and the outer diameter of the tire of the front wheel 14, and the moving velocity of the rear wheel 21 can be calculated by using the rear wheel rotating speed Rr and the outer diameter of the tire of the rear wheel 21. In addition, when the motorcycle 1 is running in a normal state, the vehicle speed Vc can be understood as being equal to the moving velocity of the front wheel 14 and/or the moving velocity of the rear wheel 21. Moreover, the vehicle speed ascertaining unit 56 may also ascertain the vehicle speed Vc by using the average value of the front wheel rotating speed Rf and the rear wheel rotating speed Rr and calculating the average moving velocity of the front wheel 14 and the rear wheel 21.

Moreover, the control device 50 includes a solenoid valve control unit 57 for controlling the opening of the front wheel side solenoid valve 270 of the front wheel side relative position changing device 240 and the opening of the rear wheel side solenoid valve 170 of the rear wheel side relative position changing device 140 on the basis of the vehicle speed Vc ascertained by the vehicle speed ascertaining unit 56. The solenoid valve control unit 57 will be described in detail later.

The front wheel rotating speed calculation unit 51, the rear wheel rotating speed calculation unit 52, the front wheel side moving distance ascertaining unit 53, the rear wheel side moving distance ascertaining unit 54, the vehicle speed ascertaining unit 56 and the solenoid valve control unit 57 can be realized by a CPU executing the software stored in the storage area of a ROM or the like.

The solenoid valve control unit 57 of the control device 50 is now explained in detail.

Figure 12:
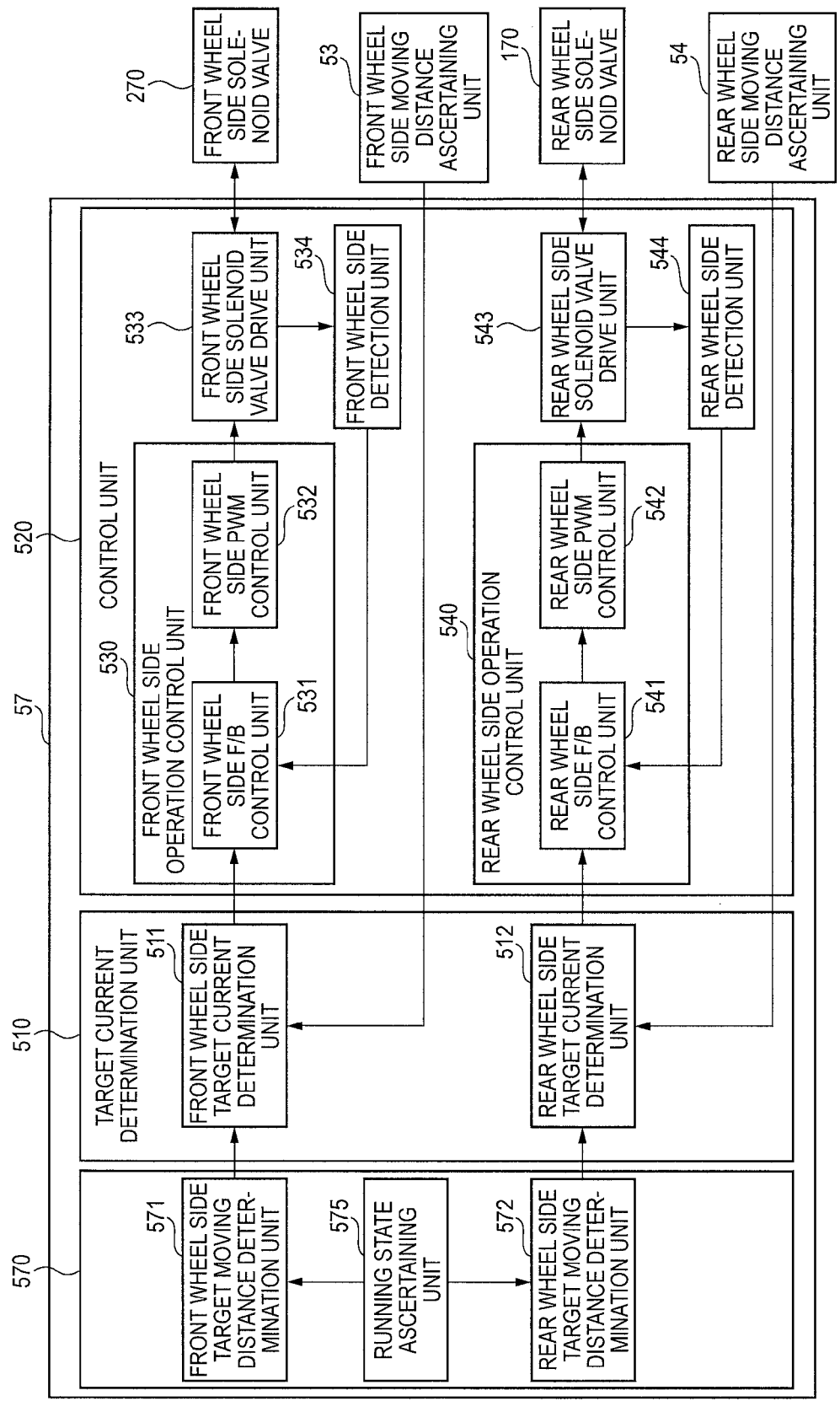
FIG. 12 is a block diagram of the solenoid valve control unit.

FIG. 12 is a block diagram of the solenoid valve control unit 57.

The solenoid valve control unit 57 comprises a target moving distance determination unit 570 including a running state ascertaining unit 575 for ascertaining the running state of the motorcycle 1, a front wheel side target moving distance determination unit 571 for determining the front wheel side target moving distance as the target moving distance of the front wheel side moving distance Lf, and a rear wheel side target moving distance determination unit 572 for determining the rear wheel side target moving distance as the target moving distance of the rear wheel side moving distance Lr. Moreover, the solenoid valve control unit 57 includes a target current determination unit 510 for determining the target current to be supplied to the front wheel side solenoid valve 270 of the front wheel side relative position changing device 240 and the rear wheel side solenoid valve 170 of the rear wheel side relative position changing device 140, and a control unit 520 for performing feedback control and the like on the basis of the target current that was determined by the target current determination unit 510.

The target moving distance determination unit 570 determines the target moving distance on the basis of the running state ascertained by the running state ascertaining unit 575, at which position the vehicle height adjustment switch 34 (described later) provided to the motorcycle 1 is located, and other factors.

Figure 13:
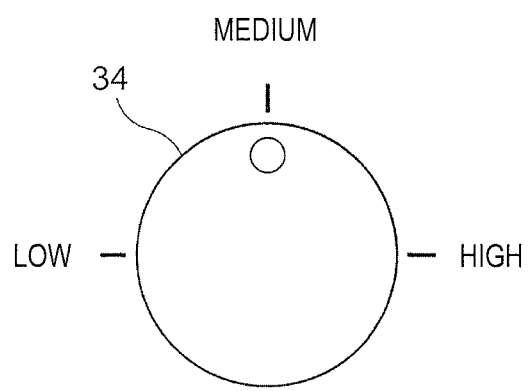
FIG. 13 is an external view of the vehicle height adjustment switch.

FIG. 13 is an external view of the vehicle height adjustment switch 34.

The vehicle height adjustment switch 34 is, for example, as shown in FIG. 13, a so-called dial switch and may be configured so that the user can rotate the switch and select "Low", "Medium" or "High". The vehicle height adjustment switch 34 is provided, for example, near the speedometer.

Figure 14A:
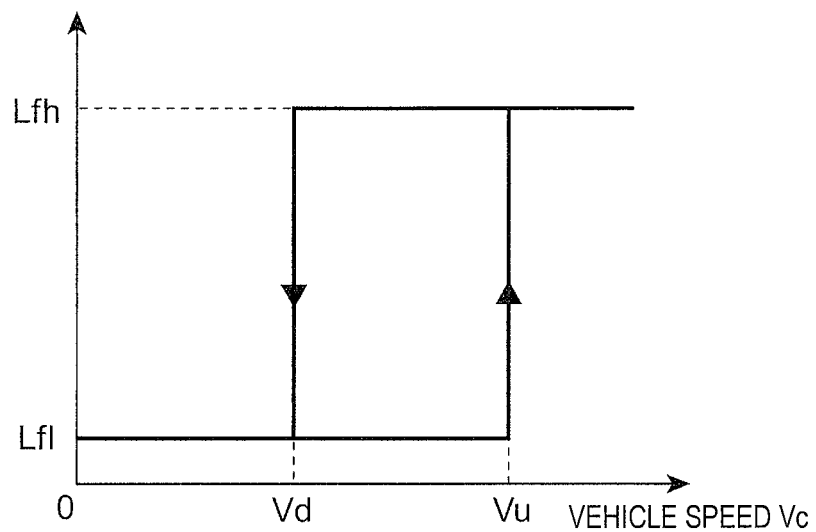
FIG. 14A is a diagram showing the correlation between the vehicle speed and the front wheel side target moving distance.
Figure 14B:
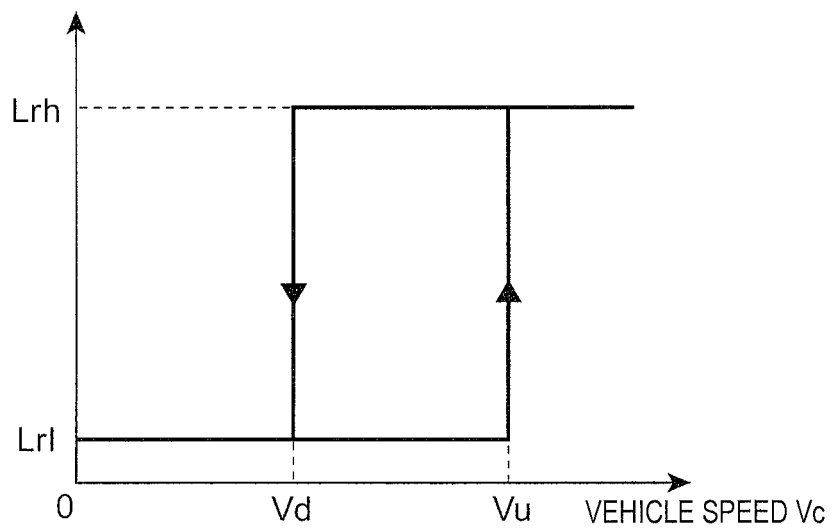
FIG. 14B is a diagram showing the correlation between the vehicle speed and the rear wheel side target moving distance.

FIG. 14A is a diagram showing the correlation between the vehicle speed Vc and the front wheel side target moving distance. FIG. 14B is a diagram showing the correlation between the vehicle speed Vc and the rear wheel side target moving distance.

The target moving distance determination unit 570 determines the target moving distance to be a predetermined minimum target moving distance according to the operation position of the vehicle height adjustment switch 34 while the vehicle speed Vc ascertained by the vehicle speed ascertaining unit 56 is smaller than a predetermined climbing vehicle speed Vu after the ignition switch of the motorcycle 1 is switched from OFF to ON. Subsequently, when the vehicle speed Vc becomes equal to or greater than the climbing vehicle speed Vu from a state of being smaller than the climbing vehicle speed Vu, the target moving distance determination unit 570 determines the target moving distance to be a predetermined maximum target moving distance according to the operation position of the vehicle height adjustment switch 34.

More specifically, as shown in FIG. 14A, the front wheel side target moving distance determination unit 571 determines the front wheel side target moving distance to be a predetermined front wheel side minimum target moving distance Lfl according to the operation position of the vehicle height adjustment switch 34 while the vehicle speed Vc is smaller than the climbing vehicle speed Vu after the ignition switch is switched from OFF to ON. Subsequently, when the vehicle speed Vc becomes equal to or greater than the climbing vehicle speed Vu from a state of being smaller than the climbing vehicle speed Vu, the front wheel side target moving distance is determined to a predetermined front wheel side maximum target moving distance Lfh according to the operation position of the vehicle height adjustment switch 34.

Meanwhile, as shown in FIG. 14B, the rear wheel side target moving distance determination unit 572 determines the rear wheel side target moving distance to be a predetermined rear wheel side minimum target moving distance Lrl according to the operation position of the vehicle height adjustment switch 34 while the vehicle speed Vc is smaller than the climbing vehicle speed Vu after the ignition switch is switched from OFF to ON. Subsequently, when the vehicle speed Vc becomes equal to or greater than the climbing vehicle speed Vu from a state of being smaller than the climbing vehicle speed Vu, the rear wheel side target moving distance is determined to a predetermined rear wheel side maximum target moving distance Lrh according to the operation position of the vehicle height adjustment switch 34.

Subsequently, while the vehicle speed Vc ascertained by the vehicle speed ascertaining unit 56 is equal to or greater than the climbing vehicle speed Vu, the front wheel side target moving distance determination unit 571 and the rear wheel side target moving distance determination unit 572 determine the front wheel side target moving distance and the rear wheel side target moving distance are determined to be the front wheel side maximum target moving distance Lfh and the rear wheel side maximum target moving distance Lrh.

Note that the relation between the operation position of the vehicle height adjustment switch 34 and the front wheel side minimum target moving distance Lfl, the front wheel side maximum target moving distance Lfh, the rear wheel side minimum target moving distance Lrl, and the rear wheel side maximum target moving distance Lrh is stored in advance in the ROM. Since the vehicle height of the motorcycle 1 is determined according to the front wheel side moving distance Lf and the rear wheel side moving distance Lr, exemplified may be a case where the minimum target vehicle height and the maximum target vehicle height as the target values of the vehicle height of the motorcycle 1 are determined according to the operation position of the vehicle height adjustment switch 34, the front wheel side minimum target moving distance Lfl, the rear wheel side minimum target moving distance Lrl, and the front wheel side maximum target moving distance Lfh and the rear wheel side maximum target moving distance Lrh are determined in advance according to the foregoing target vehicle heights, and stored in the ROM.

Meanwhile, when the vehicle speed of the motorcycle 1 becomes equal to or less than a predetermined lowering vehicle speed Vd from a speed that is equal to or greater than the climbing vehicle speed Vu during running, the target moving distance determination unit 570 gradually changes the target moving distance from the maximum target moving distance to the minimum target moving distance. This process will be described in detail later.

Note that the climbing vehicle speed Vu may be exemplified as 10 km/h, and the lowering vehicle speed Vd may be exemplified as 8 km/h.

The target current determination unit 510 includes a front wheel side target current determination unit 511 for determining a front wheel side target current, which is the target current of the front wheel side solenoid valve 270, on the basis of the front wheel side target moving distance determined by the front wheel side target moving distance determination unit 571, and a rear wheel side target current determination unit 512 for determining a rear wheel side target current, which is the target current of the rear wheel side solenoid valve 170, on the basis of the rear wheel side target moving distance determined by the rear wheel side target moving distance determination unit 572.

The front wheel side target current determination unit 511 determines the front wheel side target current, for example, by substituting the front wheel side target moving distance determined by the front wheel side target moving distance determination unit 571 into a map indicating the correspondence of the front wheel side target moving distance and the front wheel side target current which is created in advance on the basis of empirical rules and stored in the ROM.

The rear wheel side target current determination unit 512 determines the rear wheel side target current, for example, by substituting the rear wheel side target moving distance determined by the rear wheel side target moving distance determination unit 572 into a map indicating the correspondence of the rear wheel side target moving distance and the rear wheel side target current which is created in advance on the basis of empirical rules and stored in the ROM.

Note that the front wheel side target current determination unit 511 and the rear wheel side target current determination unit 512 determine the front wheel side target current and the rear wheel side target current to be zero when the front wheel side target moving distance and the rear wheel side target moving distance are zero. Moreover, the front wheel side target current determination unit 511 and the rear wheel side target current determination unit 512 determine the front wheel side target current and the rear wheel side target current to be a predetermined maximum current, for a given period of time, when the front wheel side target moving distance and the rear wheel side target moving distance are zero, and the front wheel side target moving distance and the rear wheel side target moving distance determined by the front wheel side target moving distance determination unit 571 and the rear wheel side target moving distance determination unit 572 are changed to a value other than zero from a state in which the front wheel side target current and the rear wheel side target current have been determined as being zero; that is, when starting the process of increasing the vehicle height from a state in which the vehicle height is not increased. After the lapse of a given period of time, the front wheel side target current determination unit 511 and the rear wheel side target current determination unit 512 determine the front wheel side target current and the rear wheel side target current according to the front wheel side target moving distance and the rear wheel side target moving distance determined by the front wheel side target moving distance determination unit 571 and the rear wheel side target moving distance determination unit 572. Note that, when the front wheel side solenoid valve 270 is a normally-closed type solenoid valve, conduction is required when the front wheel side target moving distance is zero. Moreover, when the rear wheel side solenoid valve 170 is a normally-closed type solenoid valve, conduction is required when the rear wheel side target moving distance is zero.

Moreover, upon determining the front wheel side target current on the basis of the front wheel side target moving distance determined by the front wheel side target moving distance determination unit 571, after the lapse of a fixed period, the front wheel side target current determination unit 511 performs feedback control on the basis of a deviation between the front wheel side target moving distance determined by the front wheel side target moving distance determination unit 571 and the actual front wheel side moving distance Lf ascertained by the front wheel side moving distance ascertaining unit 53. Similarly, upon determining the rear wheel side target current on the basis of the rear wheel side target moving distance determined by the rear wheel side target moving distance determination unit 572, after the lapse of a fixed period, the rear wheel side target current determination unit 512 performs feedback control on the basis of a deviation between the rear wheel side target moving distance determined by the rear wheel side target moving distance determination unit 572 and the actual rear wheel side moving distance Lr ascertained by the rear wheel side moving distance ascertaining unit 54.

The control unit 520 includes a front wheel side operation control unit 530 for controlling the operation of the front wheel side solenoid valve 270, a front wheel side solenoid valve drive unit 533 for driving the front wheel side solenoid valve 270, and a front wheel side detection unit 534 for detecting the actual current that is actually flowing to the front wheel side solenoid valve 270. Moreover, the control unit 520 includes a rear wheel side operation control unit 540 for controlling the operation of the rear wheel side solenoid valve 170, a rear wheel side solenoid valve drive unit 543 for driving the rear wheel side solenoid valve 170, and a rear wheel side detection unit 544 for detecting the actual current that is actually flowing to the rear wheel side solenoid valve 170.

The front wheel side operation control unit 530 includes a front wheel side feedback (F/B) control unit 531 that performs feedback control on the basis of a deviation between the front wheel side target current determined by the front wheel side target current determination unit 511 and the actual current (front wheel side actual current) detected by the front wheel side detection unit 534, and a front wheel side PWM control unit 532 for performing PWM control to the front wheel side solenoid valve 270.

The rear wheel side operation control unit 540 includes a rear wheel side feedback (F/B) control unit 541 that performs feedback control on the basis of a deviation between the rear wheel side target current determined by the rear wheel side target current determination unit 512 and the actual current (rear wheel side actual current) detected by the rear wheel side detection unit 544, and a rear wheel side PWM control unit 542 for performing PWM control to the rear wheel side solenoid valve 170.

The front wheel side feedback control unit 531 obtains a deviation between the front wheel side target current, and the front wheel side actual current detected by the front wheel side detection unit 534, and performs the feedback processing so that the deviation becomes zero. The rear wheel side feedback control unit 541 obtains a deviation between the rear wheel side target current, and the rear wheel side actual current detected by the rear wheel side detection unit 544, and performs the feedback processing so that the deviation becomes zero. The front wheel side feedback control unit 531 and the rear wheel side feedback control unit 541 may be exemplified, for example, as performing proportional processing with proportional elements and integration processing with integral elements relative to the deviation between the front wheel side target current and the front wheel side actual current and the deviation between the rear wheel side target current and the rear wheel side actual current, and adding the foregoing values with an addition operation unit. Otherwise, the front wheel side feedback control unit 531 and the rear wheel side feedback control unit 541 may be exemplified, for example, as performing proportional processing with proportional elements, integration processing with integral elements and differential processing with differentiating elements relative to the deviation between the target current and the actual current, and adding the foregoing values with an addition operation unit.

The front wheel side PWM control unit 532 changes a duty ratio ($=t/T \times 100(\%)$) of a pulse width (t) of a constant period (T), and performs PWM control to the opening of the front wheel side solenoid valve 270 (voltage that is applied to the coil of the front wheel side solenoid valve 270). When PWM control is performed, the voltage applied to the coil of the front wheel side solenoid valve 270 is applied to the pulse shape according to the duty ratio. Here, the current flowing to the coil 271 of the front wheel side solenoid valve 270 is output without being able to follow the voltage applied to the pulse shape and change due to the impedance of the coil 271, and the current flowing to the coil of the front wheel side solenoid valve 270 increases/decreases in proportion to the duty ratio. The front wheel side PWM control unit 532 can be exemplified, for example, as setting the duty ratio to zero when the front wheel side target current is zero, and setting the duty ratio to 100% when the front wheel side target current is the foregoing maximum current.

Similarly, the rear wheel side PWM control unit 542 changes the duty ratio, and performs PWM control to the opening of the rear wheel side solenoid valve 170 (voltage that is applied to the coil of the rear wheel side solenoid valve 170). When PWM control is performed, the voltage applied to the coil 171 of the rear wheel side solenoid valve 170 is applied to the pulse shape according to the duty ratio, and the current flowing to the coil 171 of the rear wheel side solenoid valve 170 increases/decreases in proportion to the duty ratio. The rear wheel side PWM control unit 542 can be exemplified, for example, as setting the duty ratio to zero when the rear wheel side target current is zero, and setting the duty ratio to 100% when the rear wheel side target current is the foregoing maximum current.

The front wheel side solenoid valve drive unit 533 comprises a transistor (FET) as a switching element connected between a positive side line of a power source and a coil of the front wheel side solenoid valve 270. In addition, by driving a gate of the transistor and causing the transistor to perform a switching operation, the drive of the front wheel side solenoid valve 270 is controlled. The rear wheel side solenoid valve drive unit 543 comprises, for example, a transistor connected between a positive side line of a power source and a coil of the rear wheel side solenoid valve 170. In addition, by driving a gate of the transistor and causing the transistor to perform a switching operation, the drive of the rear wheel side solenoid valve 170 is controlled.

The front wheel side detection unit 534 detects the value of the actual current flowing to the front wheel side solenoid valve 270 from the voltage that is generated at either end of the shunt resistor connected to the front wheel side solenoid valve drive unit 533. The rear wheel side detection unit 544 detects the value of the actual current flowing to the rear wheel side solenoid valve 170 from the voltage that is generated at either end of the shunt resistor connected to the rear wheel side solenoid valve drive unit 543.

In the motorcycle 1 configured as described above, the solenoid valve control unit 57 of the control device 50 determines the target current on the basis of the target vehicle height according to the operation position of the vehicle height adjustment switch 34, and performs PWM control so that the actual current supplied to the front wheel side solenoid valve 270 and the rear wheel side solenoid valve 170 becomes the target current. In other words, the front wheel side PWM control unit 532 and the rear wheel side PWM control unit 542 of the solenoid valve control unit 57 control the power supplied to the coils 271, 171 of the front wheel side solenoid valve 270 and the rear wheel side solenoid valve 170 by changing the duty ratio, and controls the front wheel side solenoid valve 270 and the rear wheel side solenoid valve 170 to be an arbitrary opening. Consequently, since the control device 50 can change the vehicle height to an arbitrary height by controlling the opening of the front wheel side solenoid valve 270 and the rear wheel side solenoid valve 170 and controlling the upper limit of the amount of liquid (oil) that flows into the jack chamber 242 and the jack chamber 142, the control device 50 can change the vehicle height in multiple steps or continuously. Note that the front wheel side PWM control unit 532 and the rear wheel side PWM control unit 542 of the solenoid valve control unit 57 may also be controlled so that the detected moving distance coincides with the target moving distance. Here, the front wheel side PWM control unit 532 and the rear wheel side PWM control unit 542 determine the target current on the basis of the target moving distance and the detected moving distance.

Moreover, in the foregoing control device 50, the front wheel side target current determination unit 511 and the rear wheel side target current determination unit 512 determine the front wheel side target current and the rear wheel side target current to be values according to the operation position of the vehicle height adjustment switch 34 when the vehicle speed Vc is equal to or greater than the climbing vehicle speed Vu, and the front wheel side PWM control unit 532 and the rear wheel side PWM control unit 542 set the duty ratio so that the current supplied to the front wheel side solenoid valve 270 and the rear wheel side solenoid valve 170 becomes a value according to the operation position of the vehicle height adjustment switch 34. It is thereby possible to reduce the current flowing to the coil 271 and the coil 171 in comparison to the case of applying a voltage in a non-pulse shape (continuously) to the coil 271 and the coil 171 of the front wheel side solenoid valve 270 and the rear wheel side solenoid valve 170. It is thereby possible to suppress the heat generation of the front wheel side solenoid valve 270 and the rear wheel side solenoid valve 170, and achieve power saving and downsizing.

[Target Moving Distance Determination Processing]

The basic processing for the target moving distance determination unit 570 to determine the target moving distance is now explained.

FIG. 15 is a flowchart showing a routine of the basic processing performed by the running state ascertaining unit 575. The running state ascertaining unit 575 repeatedly executes this basic processing every predetermined period (for example, every 4 milliseconds).

The running state ascertaining unit 575 foremost checks whether a maximum flag is OFF in the setting of the flag (this is also sometimes referred to as a "flag setting") that is set in the RAM (step (this is hereinafter simply indicated as "S") 101). Here, a maximum flag is a flag that is set when the vehicle speed Vc becomes equal to or greater than the climbing vehicle speed Vu from a state of being smaller than the climbing vehicle speed Vu, and is set in S103 described later.

When the maximum flag is OFF (S101: Yes), whether the vehicle speed Vc is equal to or greater than the climbing vehicle speed Vu is determined (S102). When the vehicle speed Vc is equal to or greater than the climbing vehicle speed Vu (S102: Yes), the maximum flag is set to ON (S103), and an instruction (command) is sent to the front wheel side target moving distance determination unit 571 and the rear wheel side target moving distance determination unit 572 so as to raise the vehicle height to the maximum target vehicle height (S104). Consequently, the front wheel side target moving distance determination unit 571 and the rear wheel side target moving distance determination unit 572 determine the front wheel side target moving distance and the rear wheel side target moving distance to be the front wheel side maximum target moving distance Lfh and the rear wheel side maximum target moving distance Lrh.

Meanwhile, when the vehicle speed Vc is not equal to or greater than the climbing vehicle speed Vu (S102: No), this processing is ended.

Meanwhile, when the maximum flag is ON (S101: No), whether the vehicle speed Vc is equal to or less than the lowering vehicle speed Vd is determined (S105). When the vehicle speed Vc is equal to or less than the lowering vehicle speed Vd (S105: Yes), the maximum flag is set to OFF (S106), and an instruction (command) is sent to the front wheel side target moving distance determination unit 571 and the rear wheel side target moving distance determination unit 572 so as to execute the fadeout processing described later (S107). Meanwhile, when the vehicle speed Vc is not equal to or less than the lowering vehicle speed Vd (S105: No), the rapid deceleration assessment processing described later is executed (S108).

[Fadeout Processing]

The fadeout processing of the target moving distance determination unit 570 gradually changing the target moving distance from the maximum target moving distance to the minimum target moving distance is now explained.

When the vehicle speed of the motorcycle 1 becomes equal to or less than the lowering vehicle speed Vd from a speed that is equal to or greater than the climbing vehicle speed Vu during running, the target moving distance determination unit 570 gradually changes the target moving distance from the maximum target moving distance to the minimum target moving distance over a predetermined lowering period Tl.

More specifically, the front wheel side target moving distance determination unit 571 determines, on the basis of Formula (1) below, a front wheel side target moving distance Lf(t), which is a target value of the front wheel side moving distance Lf, at an elapsed time t after the vehicle speed Vc becomes equal to or less than the lowering vehicle speed Vd and the process of lowering the vehicle height is started.

$$Lf(t)=(Tl-t)/Tl \times Lfh+(1-(Tl-t)/Tl) \times Lfl \quad (1)$$

Moreover, the rear wheel side target moving distance determination unit 572 determines, on the basis of Formula (2) below, a rear wheel side target moving distance Lr(t), which is a target value of the rear wheel side moving distance Lr, at an elapsed time t after the vehicle speed Vc becomes equal to or less than the lowering vehicle speed Vd and the process of lowering the vehicle height is started.

$$Lr(t)=(Tl-t)/Tl \times Lrh+(1-(Tl-t)/Tl) \times Lrl \quad (2)$$

Note that the lowering period Tl can be exemplified, for example, as 5 sec.

The routine of the fadeout processing (S107 of FIG. 15) performed by the front wheel side target moving distance determination unit 571 is now explained with reference to a flowchart.

Figure 16:
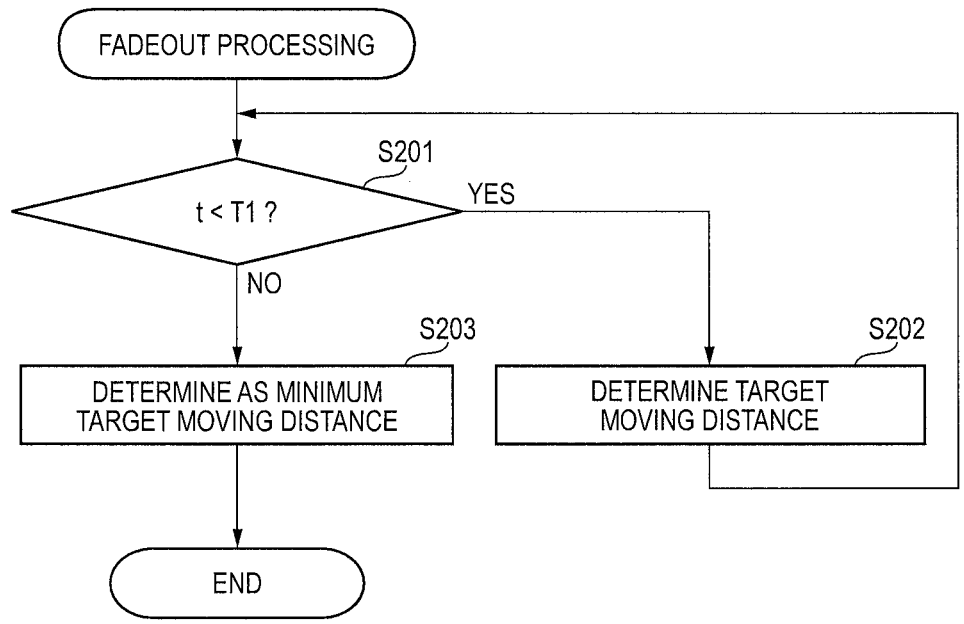
FIG. 16 is a flowchart showing a routine of the fadeout processing performed by the front wheel side target moving distance determination unit.

FIG. 16 is a flowchart showing a routine of the fadeout processing performed by the front wheel side target moving distance determination unit 571.

The front wheel side target moving distance determination unit 571 determines whether the elapsed time t after the start of the fadeout processing is less than the lowering period Tl (S201). When the elapsed time t is less than the lowering period Tl (S201: Yes), the front wheel side target moving distance determination unit 571 determines the front wheel side target moving distance Lf(t) on the basis of Formula (1) above (S202), and proceeds to the processing of S201.

Meanwhile, when the elapsed time t is equal to or greater than the lowering period Tl (S201: No), the front wheel side target moving distance determination unit 571 determines the front wheel side target moving distance to be the front wheel side minimum target moving distance Lfl (S203), and ends the execution of this processing.

Note that, while the flowchart shown in FIG. 16 illustrates the routine of the fadeout processing performed by the front wheel side target moving distance determination unit 571, the rear wheel side target moving distance determination unit 572 also performs similar processing. In S202, the rear wheel side target moving distance determination unit 572 determines the rear wheel side target moving distance Lr(t) on the basis of Formula (2) above.

As explained above, when the vehicle speed of the motorcycle 1 becomes equal to or less than the lowering vehicle speed Vd from a speed that is equal to or greater than the climbing vehicle speed Vu during running, the target moving distance determination unit 570 gradually changes the target moving distance from the maximum target moving distance to the minimum target moving distance. However, for example, when the motorcycle 1 stops during rapid deceleration, there is a possibility that the vehicle height is not lowered all the way to the intended height. When the motorcycle 1 is stopped, it is desirable that the vehicle height is lowered all the way the intended height so that the driver can easily step foot on the ground.

Thus, the target moving distance determination unit 570 according to this embodiment determines whether the motorcycle 1 is in a rapid deceleration state, and performs rapid deceleration control when the motorcycle 1 is in a rapid deceleration state.

Here, the target moving distance determination unit 570 performs the setting so that the vehicle height becomes the minimum target vehicle height at a time that is earlier than the estimated stopping time Ts, which is the estimated time that the motorcycle 1 will stop, by a predetermined preliminary period Tb. In other words, the target moving distance determination unit 570 determines the target moving distance so that the vehicle height becomes the minimum target vehicle height at the timing of estimated stopping time Ts–preliminary period Tb.

The running state ascertaining unit 575 of the target moving distance determination unit 570 determines that the motorcycle 1 is in a rapid deceleration state when a vehicle height lowering completion time Te obtained by subtracting the preliminary period Tb from the estimated stopping time Ts is equal to or less than the vehicle height lowering set time Td that is set in advance as the time required for lowering the vehicle height, and when the vehicle speed Vc is equal to or less than a predetermined high vehicle speed determination value Vh. In other words, the fact that the vehicle height lowering completion time Te is equal to or less than the vehicle height lowering set time Td and the fact that the vehicle speed Vc is equal to or less than the high vehicle speed determination value Vh are the rapid deceleration conditions for determining that the motorcycle 1 is in a rapid deceleration state. When the front wheel side target moving distance determination unit 571 and the rear wheel side target moving distance determination unit 572 determine that the motorcycle 1 is in a rapid deceleration state (when the rapid deceleration conditions are satisfied), they execute the rapid deceleration control processing described later so that the vehicle height becomes the minimum target vehicle height at the timing of estimated stopping time Ts–preliminary period Tb. Note that Tb may also be set as the subsequent period, and the vehicle height lowering completion time Te may be calculated by adding the subsequent period Tb to the estimated stopping time Ts.

Meanwhile, when the vehicle height lowering completion time Te becomes longer than the vehicle height lowering set time Td or the vehicle speed Vc becomes greater than the high vehicle speed determination value Vh during the execution of the rapid deceleration control processing, the target moving distance determination unit 570 discontinues the rapid deceleration control processing, and raises the vehicle height up to the maximum target vehicle height.

Note that the high vehicle speed determination value Vh may be exemplified as 40 km/h. The reason why the motorcycle 1 is determined as being in a rapid deceleration state when the vehicle speed Vc is equal to or less than the high vehicle speed determination value Vh is because, for example, it is considered that the motorcycle 1 has temporarily decelerated to make a curve.

[Rapid Deceleration Assessment Processing]

The routine of the rapid deceleration assessment processing (S108 in FIG. 15) performed by the running state ascertaining unit 575 of the target moving distance determination unit 570 is now explained with reference to a flowchart.

Figure 17:
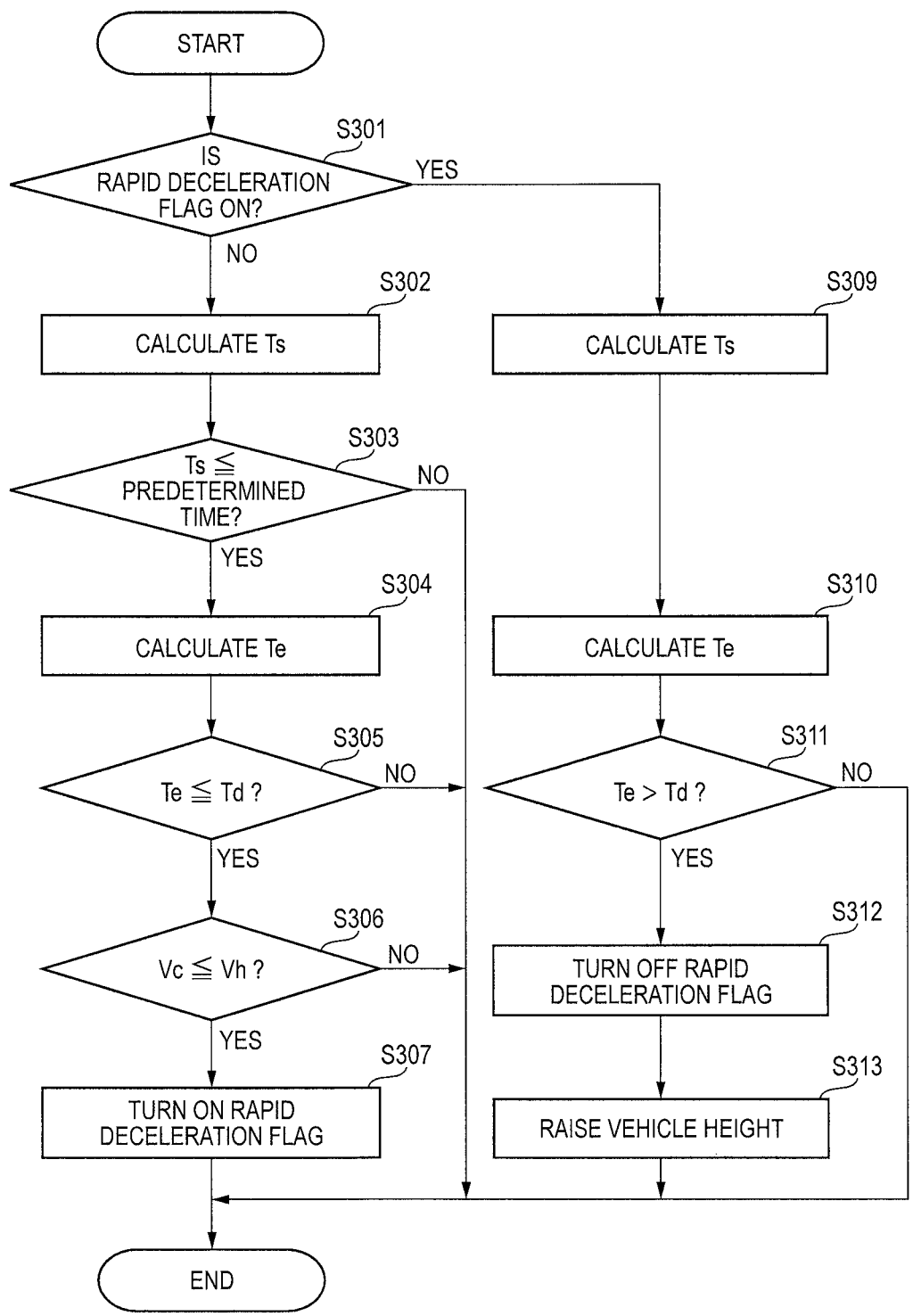
FIG. 17 is a flowchart showing a routine of the rapid deceleration assessment processing performed by the running state ascertaining unit.

FIG. 17 is a flowchart showing a routine of the rapid deceleration assessment processing performed by the running state ascertaining unit 575.

The running state ascertaining unit 575 foremost checks whether a rapid deceleration flag is ON in the flag setting (S301). Here, a rapid deceleration flag is a flag that is set when it is determined that the motorcycle 1 is in a rapid deceleration state, and is set in S307 described later. When the rapid deceleration flag is OFF (S301: No), the estimated stopping time Ts of the motorcycle 1 calculated on the basis of the current vehicle speed Vc and vehicle acceleration (deceleration) (S302). Note that the vehicle acceleration can be ascertained on the basis of the output value from the front wheel rotating speed calculation unit 51 (refer to FIG. 11). Moreover, the estimated stopping time Ts (seconds) can be calculated by dividing the current vehicle speed Vc (km/h) by ((−1)×vehicle acceleration (G)×35.28 (km/h/seconds)).

Subsequently, whether the calculated estimated stopping time Ts is equal to or less than a predetermined time (for example, 10 seconds) is determined (S303). When the estimated stopping time Ts is equal to or less than a predetermined time (for example, 10 seconds) (S303: Yes), a vehicle height lowering completion time Te (=Ts−Tb) obtained by subtracting the preliminary period Tb from the estimated stopping time Ts is calculated (S304).

Subsequently, whether the vehicle height lowering completion time Te is equal to or less than the vehicle height lowering set time Td is determined (S305). When the vehicle height lowering completion time Te is equal to or less than the vehicle height lowering set time Td (S305: Yes), whether the current vehicle speed Vc is equal to or less than the high vehicle speed determination value Vh is determined (S306). When the vehicle speed Vc is equal to or less than the high vehicle speed determination value Vh (S306: Yes), it is determined that the motorcycle 1 is in a rapid deceleration state, and the rapid deceleration flag is set to ON in the RAM (S307).

Meanwhile, when the estimated stopping time Ts is longer than a predetermined time (for example, 10 seconds) (S303: No), when the vehicle height lowering completion time Te is longer than the vehicle height lowering set time Td (S305: No), or when the vehicle speed Vc is greater than the high vehicle speed determination value Vh (S306: No), it is determined that he motorcycle 1 is not in a rapid deceleration state, and the execution of this processing is ended.

Meanwhile, when the rapid deceleration flag is ON (S301: Yes), the estimated stopping time Ts of the motorcycle 1 is calculated (S309), and the vehicle height lowering completion time Te (=Ts−Tb) obtained by subtracting the preliminary period Tb from the estimated stopping time Ts is calculated (S310). Subsequently, whether the vehicle height lowering completion time Te is longer than the vehicle height lowering set time Td is determined (S311). When the vehicle height lowering completion time Te is longer than the vehicle height lowering set time Td (S311: Yes), it is determined that the motorcycle 1 is no longer in a rapid deceleration state, and the rapid deceleration flag is set to OFF (S312). After the rapid deceleration flag is set to OFF in S312, an instruction (command) is sent to the front wheel side target moving distance determination unit 571 and the rear wheel side target moving distance determination unit 572 so as to discontinue the rapid deceleration control processing described later, and raise the vehicle height up to the maximum target vehicle height (S313).

[Rapid Deceleration Control Processing]

The routine of the rapid deceleration control processing performed by the front wheel side target moving distance determination unit 571 is now explained with reference to a flowchart.

Figure 18:
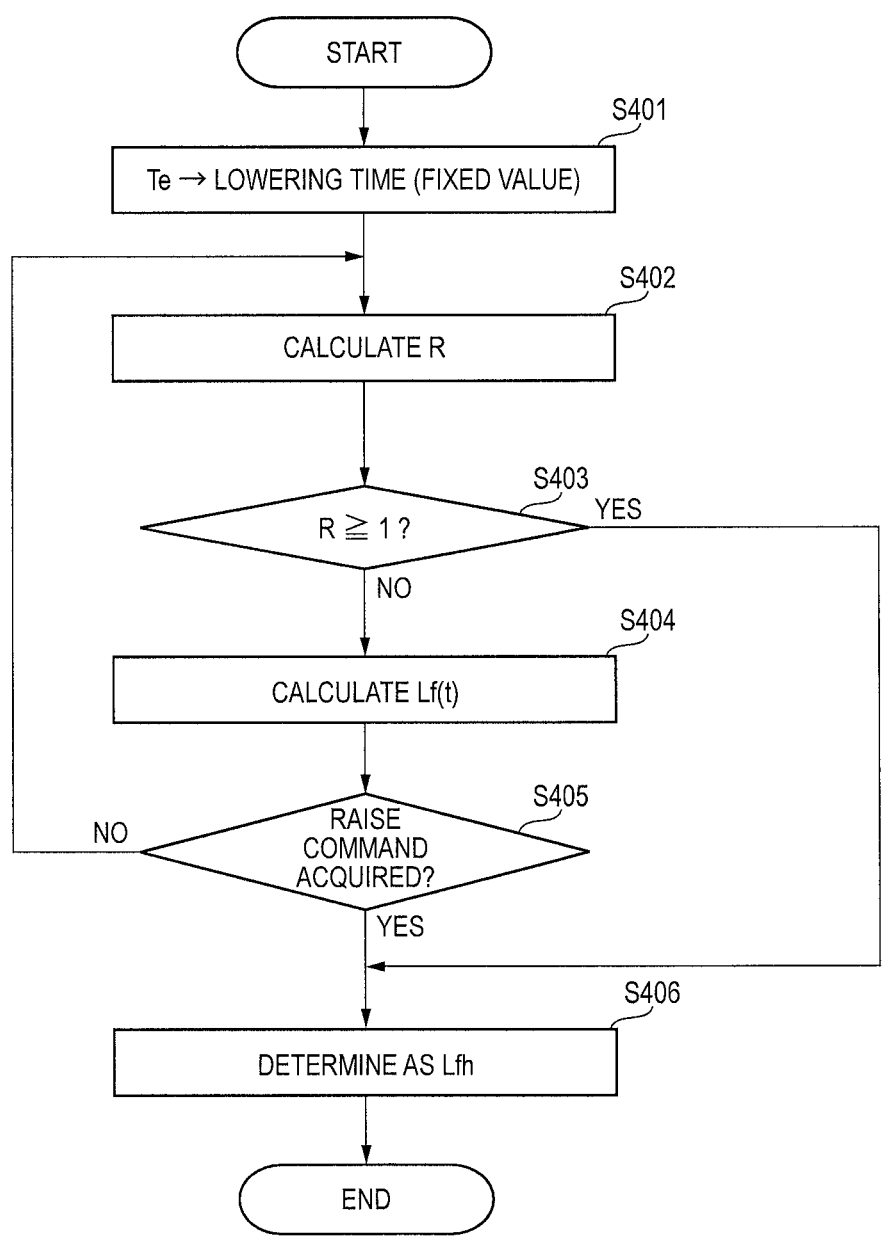
FIG. 18 is a flowchart showing a routine of the rapid deceleration control processing performed by the front wheel side target moving distance determination unit.

FIG. 18 is a flowchart showing a routine of the rapid deceleration control processing performed by the front wheel side target moving distance determination unit 571. When the rapid deceleration flag is ON, the front wheel side target moving distance determination unit 571 repeatedly executes this rapid deceleration control processing every predetermined period (for example, every 4 milliseconds).

The front wheel side target moving distance determination unit 571 foremost fixes, as the lowering time, the vehicle height lowering completion time Te at the time that the rapid deceleration control is started (S401). Subsequently, a lowering rate R is calculated by calculating the vehicle height lowering completion time Te and dividing the calculated vehicle height lowering completion time Te by the lowering time (R=Te/lowering time) (S402). Subsequently, whether the lowering rate R is equal to or greater than 1 is determined (403).

When the lowering rate R is not equal to or greater than 1 (S403: No), the front wheel side target moving distance Lf(t), which is the target value of the front wheel side moving distance Lf, at the elapsed time t after the start of the rapid deceleration control processing is determined on the basis of Formula (3) below (S404).

$$Lf(t)=R\times Lfh+(1-R)\times Lfl \qquad (3)$$

Subsequently, the front wheel side target moving distance determination unit 571 determines whether an instruction (command), which is output in S313 of the rapid deceleration assessment processing, for discontinuing the rapid deceleration control processing and raising the vehicle height up to the maximum target vehicle height, has been acquired (S405). When this instruction has been acquired (S405: Yes), the front wheel side target moving distance is determined to be the front wheel side maximum target moving distance Lfh (S406). Meanwhile, when this instruction has not been acquired (S405: No), the processing of S402 onward is executed once again.

Meanwhile, when the lowering rate R that is calculated when the deceleration decreases or the vehicle accelerates becomes 1 or more (S403: Yes), the front wheel side target moving distance is determined to be the front wheel side maximum target moving distance Lfh (S406), and the execution of this processing is ended.

Note that, while the flowchart shown in FIG. 18 illustrates the routine of the rapid deceleration control processing performed by the front wheel side target moving distance determination unit 571, the rear wheel side target moving distance determination unit 572 also performs similar processing. In the foregoing case, in the processing of S403 described above, the rear wheel side target moving distance determination unit 572 determines, on the basis of Formula (4) below, the rear wheel side target moving distance Lr(t), which is the target value of the rear wheel side moving distance Lr, at the elapsed time t after the start of the rapid deceleration control processing.

$$Lr(t)=R\times Lrh+(1-R)\times Lrl \qquad (4)$$

The control device 50 configured as described above controls the front fork 13 and the rear suspension 22 so that, when the rapid deceleration conditions are not satisfied in a state where the motorcycle 1 is running at a speed that is equal to or greater than the climbing vehicle speed Vu, the process of lowering the vehicle height is started when the vehicle speed Vc becomes equal to or less than the lowering vehicle speed Vd, and, when the rapid deceleration conditions are satisfied, the process of lowering the vehicle height is started even when the vehicle speed Vc is greater than the lowering vehicle speed Vd. More specifically, according to the target moving distance determination unit 570 of this embodiment, when it is determined that motorcycle 1 is in a rapid deceleration state in a state where the motorcycle 1 is running at a speed that is equal to or greater than the climbing vehicle speed Vu, the front wheel side target moving distance and the rear wheel side target moving distance are determined so that the vehicle height becomes the minimum target vehicle height, which is an example of the target vehicle height during stoppage, at a time that is earlier than the estimated stopping time Ts of the motorcycle 1 by a preliminary period Tb. Thus, since the vehicle height can be lowered to the intended height at the timing that the motorcycle 1 stops, irrespective of the deceleration state of the motorcycle 1, the driver can easily step foot on the ground.

Moreover, the control device 50 configured as described above changes the rate of changing the vehicle height to the target vehicle height during stoppage (minimum target vehicle height) on the basis of the deceleration of the motorcycle 1. More specifically, the control device 50 estimates the estimated stopping time Ts on the basis of the vehicle speed Vc and the deceleration of the motorcycle 1, and changes the vehicle height change rate on the basis of the vehicle height lowering completion time Te which is obtained by adding or subtracting a predetermined time to or from the estimated stopping time Ts (earlier by a preliminary period Tb in this embodiment). In addition, when the vehicle height lowering completion time Te is longer than the vehicle height lowering set time Td, the control device 50 changes the target vehicle height to the target vehicle height during stoppage at a predetermined vehicle height change rate when the vehicle speed Vc is equal to or less than the lowering vehicle speed Vd (S107). Meanwhile, when the vehicle height lowering completion time Te is equal to or less than the vehicle height lowering set time Td, the control device 50 changes the target vehicle height to the target vehicle height during stoppage at a predetermined vehicle height change rate (S404). In the foregoing case, when the estimated stopping time Ts becomes longer than the vehicle height lowering set time Td, the control device 50 sets the target vehicle height to be the maximum target vehicle height as an example of the target vehicle height during running (S313). Based on the foregoing processes, the vehicle height can be lowered to the intended height at the timing that the motorcycle 1 stops, irrespective of the deceleration state of the motorcycle 1.

Moreover, the control device 50 sets the target vehicle height to be the target vehicle height during stoppage when the vehicle speed Vc of the motorcycle 1 is equal to or less than the lowering reference vehicle speed, and changes the lowering reference vehicle speed on the basis of the deceleration of the motorcycle 1. For example, when the deceleration is small, the control device 50 sets the target vehicle height to be the target vehicle height during stoppage when the vehicle speed Vc is equal to or less than the lowering vehicle speed Vd, and, when the deceleration is great, the control device 50 sets the target vehicle height to be the target vehicle height during stoppage when the vehicle speed Vc is equal to or less than the high vehicle speed determination value Vh. In other words, the control device 50 estimates the estimated stopping time Ts on the basis of the vehicle speed Vc and the deceleration of the motorcycle 1, and changes the vehicle height change rate and the lowering reference vehicle speed on the basis of the vehicle height lowering completion time Te which is obtained by adding or subtracting a predetermined time to or from the estimated stopping time Ts (earlier by a preliminary period Tb in this embodiment). In addition, an upper limit may be set to the lowering reference vehicle speed. In the foregoing embodiment, the high vehicle speed determination value Vh is used as the upper limit of the lowering reference vehicle speed, and the high vehicle speed determination value Vh may be exemplified as 40 km/h. The reason why an upper limit is provided is because, for example, it is considered that the motorcycle 1 will temporarily decelerate to make a curve.

Note that, in the processing explained with reference to FIG. 15 to FIG. 18, in cases where it is determined that the motorcycle 1 is in a rapid deceleration state and the front wheel side target moving distance and the rear wheel side target moving distance have been determined according to the rapid deceleration control processing, when the vehicle speed Vc becomes equal to or less than the lowering vehicle speed Vd (S105 in FIG. 15: Yes), fadeout processing is executed. Here, in the fadeout processing, the front wheel side moving distance Lf and the rear wheel side moving distance Lr at the start of the fadeout processing are not the front wheel side maximum target moving distance Lfh and the rear wheel side maximum target moving distance Lrh, and are a moving distance that is smaller according to the rapid deceleration control processing, the terms shall be replaced as follows upon making the determinations on the basis of Formula (1) and Formula (2). Specifically, the front wheel side maximum target moving distance Lfh and the rear wheel side maximum target moving distance Lrh shall be replaced with the front wheel side moving distance Lf and the rear wheel side moving distance Lr at the start of the fadeout processing. Moreover, the lowering period Tl used in Formula (1) shall be replaced with Tl×(front wheel side moving distance Lf at the start of the fadeout processing/front wheel side maximum target moving distance Lfh), and the lowering period Tl used in Formula (2) shall be replaced with Tl×(rear wheel side moving distance Lr at the start of the fadeout processing/rear wheel side maximum target moving distance Lrh).

What is claimed is:

1. A vehicle height adjusting device, comprising:

a changing unit capable of changing a relative position between a vehicle body of a vehicle and wheels of the vehicle; and a control unit that adjusts a vehicle height, which is a height of the vehicle body, by controlling the changing unit to change the relative position, wherein the control unit changes a vehicle height change rate, which is a rate of changing the vehicle height to a target vehicle height during stoppage, on the basis of deceleration of the vehicle, estimates an estimated stopping time on the basis of the vehicle speed and the deceleration of the vehicle, and changes the vehicle height change rate on the basis of a vehicle height lowering completion time which is obtained by adding or subtracting a certain time to or from the estimated stopping time.

2. The vehicle height adjusting device according to claim 1, wherein the control unit sets a target vehicle height to the target vehicle height during stoppage when a vehicle speed of the vehicle is equal to or less than a lowering reference vehicle speed, and changes the lowering reference vehicle speed on the basis of the deceleration of the vehicle.

3. The vehicle height adjusting device according to claim 2, wherein an upper limit is set to the lowering reference vehicle speed.

4. The vehicle height adjusting device according to claim 1, wherein the control unit changes the target vehicle height to the target vehicle height during stoppage at a certain vehicle height change rate when the vehicle speed is equal to or less than a certain vehicle speed.

5. The vehicle height adjusting device according to claim 1, wherein the control unit sets the target vehicle height to a target vehicle height during running when the estimated stopping time becomes longer than a certain set time.

6. A vehicle height adjusting method of adjusting a vehicle height, which is a height of a vehicle body of a vehicle, by changing a relative position between the vehicle body and wheels of the vehicle, the method comprising the steps of:

changing a vehicle height change rate, which is a rate of changing the vehicle height to a target vehicle height during stoppage, on the basis of deceleration of the vehicle;

estimating an estimated stopping time based on a vehicle speed and a deceleration of the vehicle; and changing the vehicle height change rate based on a vehicle height lowering completion time, which is obtained by adding or subtracting a certain time to or from the estimated stopping time.

\* \* \* \* \*